US006434196B1

(12) United States Patent
Sethuraman et al.

(10) Patent No.: US 6,434,196 B1
(45) Date of Patent: Aug. 13, 2002

(54) METHOD AND APPARATUS FOR ENCODING VIDEO INFORMATION

(75) Inventors: Sriram Sethuraman, Hightstown; Tihao Chiang, Plainsboro; Xudong Song; Ravi Krishnamurthy, both of Princeton; Paul Hatrack, Plainsboro; Ya-Qin Zhang, Cranbury, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/285,582

(22) Filed: Apr. 2, 1999

Related U.S. Application Data

(63) Continuation-in-part of application No. 09/196,072, filed on Nov. 19, 1998, and a continuation-in-part of application No. 09/151,425, filed on Sep. 11, 1998, now Pat. No. 6,167,088, and a continuation-in-part of application No. 09/105,730, filed on Jun. 26, 1998.
(60) Provisional application No. 60/080,536, filed on Apr. 3, 1998.

(51) Int. Cl.[7] .............................. H04B 1/66; H04N 7/12
(52) U.S. Cl. ................................. 375/240.12; 348/415.1
(58) Field of Search ................................. 348/415, 416, 348/387, 699, 700, 701, 412, 404, 405, 588, 390; 375/240, 240.19, 240.12, 240.11; 386/4, 240.16, 111; 382/236, 107; H04N 7/12; H04B 1/66

(56) References Cited

U.S. PATENT DOCUMENTS

| 5,565,920 A | * | 10/1996 | Lee et al. | 375/240.11 |
| 5,642,174 A | * | 6/1997 | Kazui et al. | 348/700 |
| 5,675,379 A | | 10/1997 | Kato et al. | 348/97 |
| 5,754,233 A | * | 5/1998 | Takashima et al. | 348/390 |
| 5,757,421 A | * | 5/1998 | Kato et al. | 348/405 |
| 5,832,121 A | * | 11/1998 | Ando | 348/700 |
| 5,872,598 A | | 2/1999 | Legall et al. | 348/405 |
| 5,969,764 A | * | 10/1999 | Sun et al. | 348/404 |
| 5,978,029 A | * | 11/1999 | Boice et al. | 348/412 |
| 5,999,662 A | * | 12/1999 | Burt et al. | 348/588 |
| 6,023,296 A | * | 2/2000 | Lee et al. | 348/405 |
| 6,167,088 A | * | 12/2000 | Sethuraman | 375/240.1 |

FOREIGN PATENT DOCUMENTS

| EP | 0 405 754 A | 1/1991 |
| EP | 0 446 001 A | 9/1991 |
| EP | 0 762 778 A | 3/1997 |
| WO | 95/20863 | 8/1995 |
| WO | 97/39577 | 10/1997 |

OTHER PUBLICATIONS

International Search Report PCT/US 99/07474.
Tihao Chiang et al: "A New Rate Control Scheme Using Quadratic Rate Distortion Model" IEEE Transactions on Circuits and Systems for Video Technology, vol. 7, No. 1, Feb. 1, 1997, pp. 246–250, XP000678897 See the Whole Document.

* cited by examiner

Primary Examiner—Nhon Diep
Assistant Examiner—Gims Philippe
(74) Attorney, Agent, or Firm—William J. Burke

(57) ABSTRACT

A method and apparatus for encoding, illustratively, a video information stream to produce an encoded information stream according to a group of frames (GOF) information structure where the GOF structure and, optionally, a bit budget are modified in response to, respectively, information discontinuities and the presence of redundant information in the video information stream (due to, e.g., 3:2 pull-down processing).

19 Claims, 12 Drawing Sheets

X = ONE PIXEL HAVING M-STATES

X X X X = FOUR PIXELS PACKED INTO A WORD

METHOD AND APPARATUS FOR ENCODING VIDEO INFORMATION

This application claims the benefit of U.S. Provisional Application No. 60/080,536, filed Apr. 3, 1998 and incorporated herein by reference in its entirety.

This application is a continuation-in-part of U.S. patent applications Ser. No. 09/105,730, filed Jun. 26, 1998, Ser. No. 09/151,425, filed Sep. 11, 1998 now U.S. Pat. No. 6,167,088, and Ser. No. 09/196,072, filed Nov. 19, 1998, all of which are incorporated herein be reference in their entireties.

The invention relates to information compression systems generally and, more particularly, the invention relates to a method and apparatus for adapting a video information encoding system according to video source formatting and content parameters and encoded video formatting parameters.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length data structures within digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

When encoding video information it is seen to be desirable to adapt the encoding process to video source formatting parameters and encoded video formatting parameters. Unfortunately, such adaptation of the video encoding process tends to be extremely expensive in terms of both processing power and memory requirements. As such, designers of video encoders typically utilize approximations of various parameters to ease computational and memory overhead to a "reasonable" level, as defined by a particular application (e.g., professional use or consumer use).

Therefore, it is seen to be desirable to address the above-described problems by providing a robust and computationally efficient method and apparatus for adapting and/or enhancing the behavior of a video encoding process to video source formatting parameters and encoded video formatting parameters. Specifically, it is seen to be desirable to provide a video encoding method and apparatus, such as an MPEG-2 video encoding method and apparatus, that provides relatively low computational complexity and reduced memory bandwidth requirements, along with graceful and robust video quality scalability across a wide range of encoding bitrates.

SUMMARY OF THE INVENTION

The invention comprises a method and apparatus for encoding, illustratively, a video information stream to produce an encoded information stream according to a group of frames (GOF) information structure. In various embodiments of the invention, modifications are made to the GOF structure and a bit budget in response to, respectively, information discontinuities and the presence of redundant information in the video information stream (due to, e.g., 3:2 pull-down processing). Additional embodiments of the invention efficiently utilize pyramid processing techniques, packed data representations and other methods to achieve highly efficient utilization of memory and/or processing resources within the encoding environment.

Specifically, an encoding system according to the invention comprises: an encoder, for encoding each of a plurality of pre-processed information frames substantially in accordance with a group of frames (GOF) information structure; a controller, for adapting the GOF information structure in response to an inter-frame information discontinuity within the plurality of information frames; and a pre-processor, for receiving and processing a plurality of information frames to produce the plurality of pre-processed information frames, the pre-processor identifying and generating an indicium of the inter-frame information discontinuity within the plurality of information frames.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in information encoding systems, especially video information encoding systems.

Figure 1:
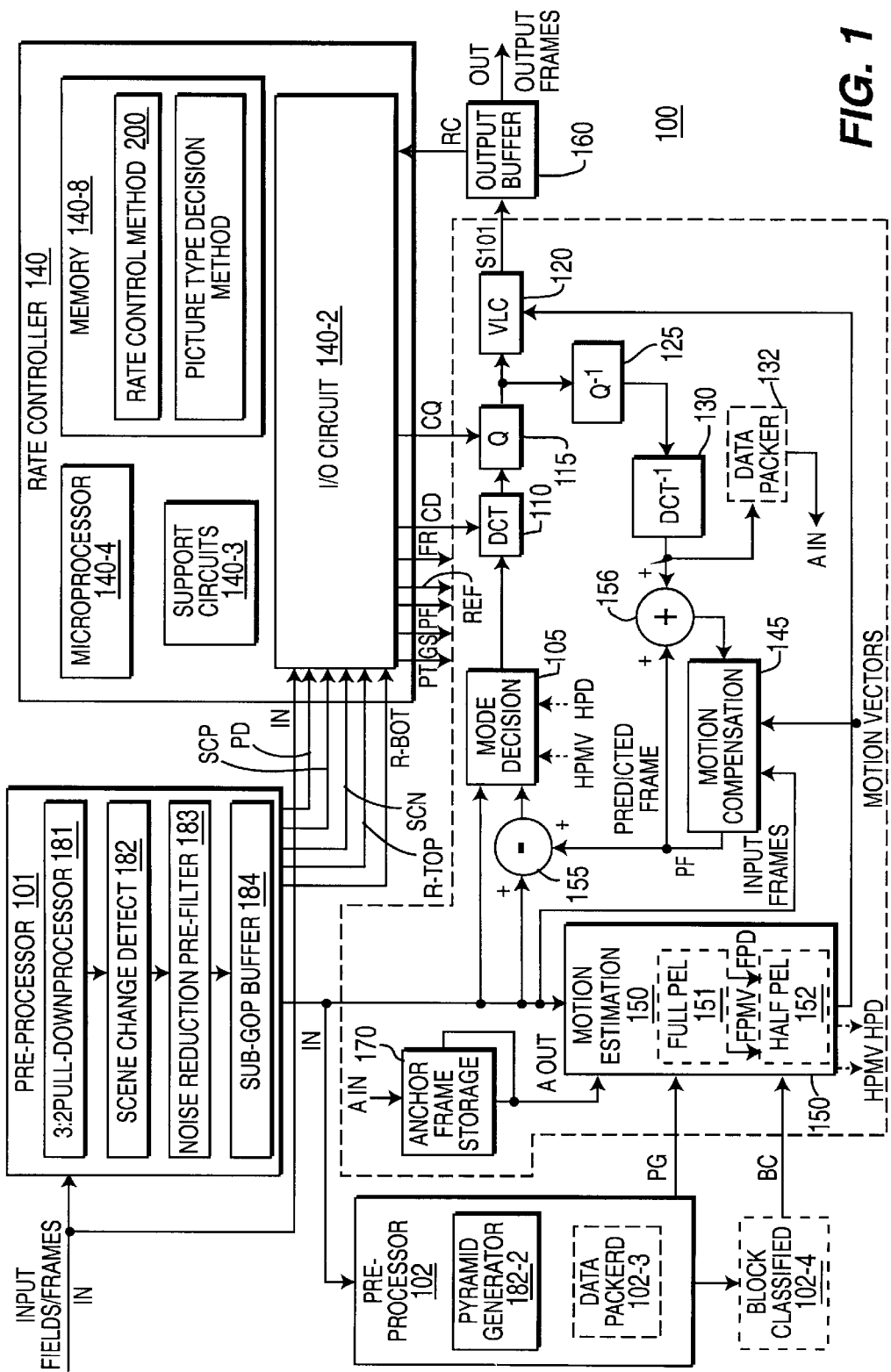
FIG. 1 depicts a high level block diagram of an MPEG-like encoding system.

FIG. 1 depicts a high level block diagram of an MPEG-like encoding system. The MPEG-like encoding system 100 of FIG. 1 receives and encodes an input information stream IN comprising a plurality of uncompressed information frames, illustratively a sequence of images forming a video information stream, to produce an encoded output information stream OUT that nominally conforms to a group of frames (GOF) or group of pictures (GOP) data structure. Each GOF/GOP data structure comprises N frames arranged as a plurality of sub-GOF or sub-GOP data structures having a maximal size of M frames. Each sub-GOF/GOP comprises a respective anchor frame (e.g., an I-frame or a P-frame) and, optionally, one or more non-anchor frames (e.g., B-frames).

Specifically, the MPEG-like encoding system 100 of FIG. 1 comprises a first pre-processor 101, a second pre-processor 102, a controller 140, an encoding module 104 and an output buffer 160.

The first pre-processor 101 receives and processes the input information stream IN to produce a pre-processed input video information stream IN'. The first pre-processor 101 includes the following functional components: a 3:2 pull-down processor 181, a scene change detector 182, a noise reduction pre-filter 183 and a sub-GOP buffer 184. The method of operation of the first pre-processor 101 will be described in more detail below with respect to FIG. 2.

The 3:2 pull-down processor 181 processes, on a frame by frame basis, the input video information stream IN and responsively produces, in one embodiment of the invention, a control signal PD indicative of the presence (e.g., native 24 fps) or absence (e.g., native 30 fps) of 3:2 pull-down processed video information within the input video information stream IN. The 3:2 pull-down indicative control signal PD is coupled to the controller 140. The 3:2 pull-down processor 181 is used to effect a reduction in the amount of information to be encoded by assisting in the identification and removal of the "extra" video information within the input video information stream IN. That is, the pull-down is undone such that the resulting information frames may be coded in a progressive (i.e., non-interlaced) manner by the encoding module 104. The output of the 3:2 pull-down processor 181 is coupled to the scene change detector 182.

In one embodiment of the invention, the 3:2 pull-down processor 181 utilizes a "field differencing" method in which consecutive fields within the input video information stream IN are compared to determine if the fields are repeated in a manner indicative of 3:2 pull-down processing of the underlying video information. In this embodiment the 3:2 pull-down processor 181 produces a control signal $R_{13}$ TOP and a control signal $R_{13}$ BOT.

The control signal $R_{13}$ TOP is used to indicate whether the video information within the top field of a video frame is substantially the same as the video information within the top field of an immediately preceding video frame.

Similarly, the control signal $R_{13}$ BOT is used to indicate whether the video information within the bottom field of the video frame is substantially the same as the video information within the bottom field of the immediately preceding video frame.

An exemplary 3:2 pull-down processor and control functionality is disclosed in U.S. patent application Ser. No. 09/151,425, filed Sep. 11, 1998, and incorporated herein by reference in its entirety. It should be noted that a reduction in the amount of computation required to perform a field to field comparison is optionally provided by using a sum of absolute differences (SAD) method to perform only a partial field comparison of the fields (top or bottom) of successive information frames.

The scene change detector 182 is used to identify information discontinuities, such as scene changes or scene cuts within the input video information stream IN (or 3:2 pull-down processed input video information stream IN). In response to the detection of an information discontinuity, the scene change detector 182 produces a first control signal SCN and a second control signal SCP indicative of the discontinuity. Specifically, the first and second scene change indicative control signals SCN and SCP are coupled to the controller 140 and used to indicate, respectively, a scene change in a next (i.e., not yet encoded) sub-GOP (SCN) and a scene change in a current (i.e., presently being encoded) sub-GOP (SCP). That is, the scene change detector operates is look-ahead based in that two information frames are compared to determine if a difference between the two frames is such that a scene change has occurred within the underlying video.

The noise reduction pre-filter 183 comprises an adaptive, non-linear noise reduction filter that reduces different types of noise such as Gaussian noise, shot noise, and tape noise while preserving high frequency information such as, in the case of video information, edges and other high contrast details with high fidelity. The noise reduction pre-filter 183 may operate on a frame by frame basis or on an entire sub-GOP stored within the sub-GOP buffer 184. Those skilled in the art will be readily able to successfully adapt one or more of the known non-linear noise-reduction filters to the present invention. For example, finite impulse response median hybrid (FMH) filters may be used to implement the noise reduction pre-filter 183 of FIG. 1.

The sub-GOP buffer 184 is capable of storing an anchor frame and any associated non-anchor frames forming a sub-GOP, as previously described. Upon completion of the various first pre-processing steps (i.e., 3:2 pull-down processing, scene change detection and filtering), the processed sub-GOP is coupled to the second pre-processor 102 and the encoding module 104 as the pre-processed input video information stream IN'.

The controller 140 receives and processes the input information stream IN, 3:2 pull-down indicative control signals PD, $R_{13}$ TOP and $R_{13}$ BOT and scene change indicative control signals SCN and SCP to produce various control signals that are used to control the operation of the encoding module 104. Specifically, the controller 140 produces the following control signals: A picture type control signal PT is used to indicate a desired frame type (i.e., P-Frame or I-Frame) of the anchor frame of the sub-GOP being encoded. A GOP structure control signal GS is used to indicate any changes to the GOP structure (e.g., the variables nPu, nBu, nBo and the like as described below with respect to FIG. 2). A progressive frame control signal PF is used to indicate the progressive coding of an information frame.

A "top field first/repeat first field" control signal RBF is used to indicate that a frame to be encoded includes repeated material and, therefore, may be encoded without the repeated material. A frame rate control signal FR indicates a desired frame rate (i.e., frames per second) of an encoded video information stream. Additionally, a quantization module control signal CQ and a discrete cosine transform module control signal CD are produced by the controller 140.

In response to an inter-frame information discontinuity within the input information stream IN (as indicated by one or more of the control signals SCN and SCP), the controller 140 adapts the encoded output information stream OUT such that the first anchor frame following the information discontinuity comprises an I-frame, while the first anchor frame preceding the information discontinuity comprises a P-frame. In this manner, bits within the bit budget allocated to each GOF/GOP structure are not "wasted" by intra-coding a frame immediately prior to the beginning of a new GOF/GOP.

In response to the presence of 3:2 pull-down processed video material in the input information stream IN (as indicated by one or more of the control signals PD, $R_{13}$ TOP and $R_{13}$ BOT), the controller 140 removes "excess" or duplicate video information from the input information stream IN, thereby increasing the number of bits able to be used in encoding the remaining portion of the information stream IN.

Thus, the controller 140, in conjunction with the 3:2 pull-down processor 181 and scene change detector 182, causes the encoding module 104 to encode across a scene change (with or without 3:2 pull-down processed material) in a smooth, high quality manner. In this manner post scene change visual artifacts in the encoded video stream OUT are greatly reduced, even at relatively low bit-rates. Additionally, pulled-down material is coded at a higher quality by exploiting the lower actual frame rate.

The encoding module 104 receives and encodes the pre-processed input information stream IN' to produce an encoded information stream S104 that substantially conforms to a group of frames (GOF) or group of pictures (GOP) data structure. The encoded information stream S104 is coupled to the output buffer 160. The encoding module 104, in response to the control signal C1 produced by the controller 140 and a rate control signal RC produced by the output buffer 160, adapts the GOF or GOP data structure, bit allocation, quantization scale and other parameters of the encoding process. The encoding module 104 optionally produces an mode decision signal MD indicative of the encoding mode (i.e., intra-coded or inter-coded) selected for a macroblock being processed. Additionally, a motion estimation module 150 within the encoding module 104 is responsive to several control signals produced by the second pre-processor 102.

The encoding module 104 comprises an subtractor 155, a mode decision module 105, a discrete cosine transform (DCT) module 110, a quantizer (Q) module 115, a variable length coding (VLC) module 120, an inverse quantizer ($Q^{-1}$) 125, an inverse discrete cosine transform ($DCT^{-1}$) module 130, an optional data packer 132, a subtractor 156, a motion compensation module 145, a motion estimation module 150, and an anchor frame storage module 170. The rate control function is performed by rate controller 140.

Subtractor 155 generates a residual signal (also referred to in the art as simply the residual or the residual macroblock) by subtracting a predicted macroblock on the signal path PF from an input macroblock on the signal path IN'.

The mode decision module 105 receives the residual macroblock (i.e., the predicted macroblock) from the subtractor 155 and the input macroblock from the signal path IN'. If the predicted macroblock is substantially similar to the input macroblock (i.e., the residuals are relatively small and are easily coded using very few bits), then the mode decision module 105 selects the residual signal from the subtractor 155 for inter-coding. That is, the macroblock will be encoded as a motion compensated macroblock, i.e., motion vector(s) and associated residual(s). However, if the difference between the predicted macroblock and the input macroblock is substantial, the residuals are costly to code. Consequently, the system operates more efficiently by directly coding the input macroblock rather than coding the motion compensated residual macroblock.

The above selection process is known as a selection of the coding mode. Coding the input macroblock is referred to as intra-coding, while coding the residuals is referred to as inter-coding. The selection between these two modes is known as the Intra-Inter-Decision (IID). The IID is typically computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Inter-mode. Conversely, if Var I is less than Var R, the IID selects the Intra-mode.

Alternatively, a mode decision method suitable for use in the MPEG-like encoder 100 of FIG. 1 is disclosed in U.S. patent application Ser. No. 08/547,741, filed Oct. 26, 1995 and incorporated herein by reference in its entirety. Briefly, the 08/547,741 application notes that the total number of bits needed to code each macroblock consists of two parts, bits needed for coding motion vectors and bits needed for coding the predictive residual. The number of bits for coding the motion vectors is generally obtained from a look-up table. The number of bits for coding the predictive residual is obtained by an estimation which assumes that the number of bits for encoding the predictive residuals is directly proportional to the value of its variance and inversely proportional to the value of quantizer steps (quantization scale). Using this estimation, the total number of bits necessary to code a macroblock is calculated and compared for each coding mode. By selecting the coding mode with the least number of bits, the invention attains a near-optimal solution of low complexity for practical implementation.

The selected block (i.e., pre-processed input macroblock or residual macroblock) is then coupled to the DCT module 110. The DCT module 110, in response to the control signal CD produced by the rate controller 140, processes the selected block to produce a set of, illustratively, eight (8) by eight (8) blocks of DCT coefficients. The DCT coefficients produced by the DCT module 110 are coupled to the quantizer module 115.

The quantizer module 115, in response to the control signal CQ produced by the rate controller 140, quantizes the received DCT coefficients to produce a quantized output block. The process of quantization reduces the accuracy with which the DCT coefficients are represented by dividing the DCT coefficients by a set of quantization values with appropriate rounding to form integer values. The quantized DCT coefficients are coupled to the variable length coding (VLC) module 120 and the inverse DCT module 125.

The VLC module 120 then encodes the received quantized DCT coefficients (e.g., an 8×8 block of quantized DCT coefficients) and any side-information for the macroblock using known variable length coding and run-length coding techniques.

To perform motion prediction and compensation, the encoding module 104 regenerates encoded anchor frames for use as reference frames. This function is performed by the inverse quantizing module 125, inverse DCT module 130 and, optionally, data packer 132.

Specifically, the inverse quantizing ($Q^{-1}$) module 125 processes the quantized DCT coefficients (e.g., an 8×8 block of quantized DCT coefficients) to produce respective DCT coefficients. The inverse DCT module 130 processes the respective DCT coefficients to produce a decoded error signal. The error signal produced by the $DCT^{-1}$ module 130 is coupled to an input of adder 156. The $DCT^{-1}$ module 130 also functions to regenerate I-frames and P-frames of the input image sequence by decoding the data so that they are used as reference frames for subsequent encoding. This reference information is coupled to the anchor frame memory 170 as information stream AIN. Optionally, data packer 132 is used to pack the reference information stream AIN prior to storing the information in the anchor frame memory 170.

Motion estimation module 150 receives the pre-processed input information stream IN' and a stored anchor frame information stream AOUT. The stored anchor frame information stream AOUT is provided by the anchor frame storage module 170, which stores an input anchor frame information stream AIN that is provided by the inverse DCT module 130. Briefly, the stored anchor frame information stream AOUT represents a decoded version of the intra-coded anchor frame of a GOF or GOP presently being encoded by the encoding module 104.

The motion estimation module 150 estimates motion vectors using the pre-processed input information stream IN' and the stored anchor frame information stream AOUT. A motion vector is a two-dimensional vector which is used by motion compensation to provide an offset from the coordinate position of a block in the current picture to the coordinates in a reference frame. The reference frames can be forward predicted coded frames (P-frames) or bidirectional (i.e., forward and backward) predicted frames (B-frames). The motion vectors are coupled to the motion compensation module 145 and the VLC module 120.

The motion estimation module 150 is optionally implemented to include a full pel motion estimator 151 and a half pel motion estimator 152. The full pel motion estimator 151 responsively produce a full pel motion vector FPMV and a full pel distortion signal (i.e., a measure of the dissimilarity between two pixel blocks) FPD. The half pel motion estimator 152 utilizes the full pel motion vector FPMV and a full pel distortion signal FPD to responsively produce a half pel motion vector HPMV and a half pel distortion signal HPD. The optional half pel motion vector HPMV and a half pel distortion signal HPD are depicted as being coupled to the mode decision module 105, where they are advantageously utilized to increase the accuracy of the mode decision.

The motion compensation module 145 utilizes the received motion vectors to improve the efficiency of the prediction of sample values. Motion compensation involves a prediction that uses motion vectors to provide offsets into the past and/or future reference frames containing previously decoded sample values that are used to form the prediction error. Specifically, the motion compensation module 150 uses previously decoded anchor frame(s) and the motion vectors to construct, an estimate of the current frame. Furthermore, those skilled in the art will realize that the functions performed by the motion estimation module and the motion compensation module can be implemented in a combined module, e.g., a single block motion compensator.

Prior to performing motion compensation prediction for a given macroblock, a coding mode must be selected. In the area of coding mode decision, the MPEG and MPEG-like standards provide a plurality of different macroblock coding modes. Specifically, MPEG-2 provides macroblock coding modes which include intra mode, no motion compensation mode (No MC), forward/backward/average inter mode and field/frame DCT mode.

Once a coding mode is selected, motion compensation module 145 generates a motion compensated prediction frame (e.g., a predicted image) on path PF of the contents of the block based on past and/or future reference pictures. This motion compensated prediction frame on path PF is subtracted, via subtractor 155, from the input information frame IN' (e.g., a video image) in the current macroblock to form an error signal or predictive residual signal. The formation of the predictive residual signal effectively removes redundant information in the input video image. As previously discussed, the predictive residual signal is coupled to the mode decision module 105 for further processing.

The VLC data stream produced by the VLC encoder 120 is received into the buffer 160, illustratively a "First In-First Out" (FIFO) buffer capable of holding at least one encoded sub-GOP according to the GOP data structure. The output buffer 160 produces a rate control signal RC indicative of a utilization level of the output buffer 160.

A consequence of using different picture types and variable length coding is that the overall bit rate into the output buffer 160 is variable. Namely, the number of bits used to code each frame can be different. In applications that involve a fixed-rate channel for coupling the output information stream OUT to, e.g., a storage medium or telecommunication channel, the output buffer 160 is used to match the encoder output to the channel for smoothing the bit rate. Thus, the output signal OUT of output buffer 160 is a compressed representation of the pre-processed input information stream IN'.

The rate control module 140 depicted in FIG. 1 comprises a microprocessor 140-4 as well as memory 140-8 for storing a simultaneous encoding, adaptive frame switching method 200 and/or an "on demand" encoding, adaptive frame switching method 400. The microprocessor 140-4 cooperates with conventional support circuitry 140-6 such as power supplies, clock circuits, cache memory and the like as well as circuits that assist in executing the software methods. As such, it is contemplated that some of the process steps discussed herein as software processes may be implemented within hardware, e.g., as circuitry that cooperates with the microprocessor 140-4 to perform various steps. The controller 140 also contains input/output circuitry 140-2 that forms an interface between the various encoding modules (104 and 102) and the selector (104). Although the controller 140 is depicted as a general purpose computer that is programmed to perform various control functions in accordance with the present invention, the invention can also be implemented in hardware as an application specific integrated circuit (ASIC). As such, any process or method steps described herein (e.g., with respect to FIGS. 2A–2C) are intended to be broadly interpreted as being equivalently performed by software, hardware, or a combination thereof.

The primary task of the rate control module 140 is to manage the fullness or utilization level of the output buffer 160, from which a constant output bit rate is provided to a transmission channel. The constant bit rate must be maintained even though the encoding rate may vary significantly, depending on the content of each image and the sequence of images. The output buffer 160 produces a rate control signal RC indicative of a utilization level of the output buffer 160.

The rate control module 140 utilizes the rate control signal RC to adapt various parameters of the encoding process, such as the quantization scale (step size) used to quantize the DCT coefficients (via control signal CQ) and/or the number of DCT coefficients via control signal CD) that are coded by the system. That is, a quantizer scale is selected for each frame such that a target bit rate for a picture is achieved while maintaining a uniform visual quality over an entire sequence of pictures. In this manner, the rate control module 140 controls the bit rate of the output information stream produced by the VLC 120, thereby maintaining an appropriate utilization level of the output buffer 160.

In one embodiment of the invention, the rate control module 140 operates according to a frame level target determination method utilizing a quadratic rate-distortion model, as described in U.S. patent application Ser. No. 08/738,228, filed on Oct. 23, 1996 and incorporated herein by reference in its entirety. Briefly, the disclosed quadratic rate distortion model provides for a second order model in Q to model the number of bits used, whereas the standard TM-5 rate control model utilizes a first order model. That is, rate control is improved by the rate controller examining the number of bits allocated to a previously encoded information frame portion (e.g., a frame, slice or macroblock) to broadly determining a complexity level of the previously encoded portion and, thereby, responsively predict a complexity level of a current or subsequent portion to be encoded. Thus, greater accuracy in managing the bit budget is provided by the more accurate model of bit utilization.

Another important task of the rate control module 140 is to insure that the bit stream produced by the encoder does not overflow or underflow an input buffer in a decoder (e.g., within a receiver or target storage device, not shown) receiving a transmission comprising the output information stream OUT. Overflow and underflow control is accomplished by maintaining and monitoring a virtual buffer within the encoder. The virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then the decoder's input buffer will not underflow or overflow.

Figure 2:
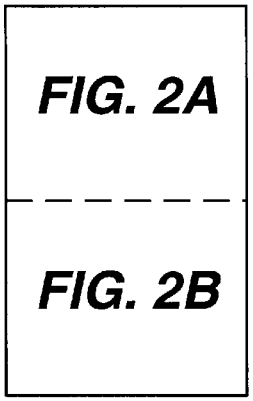
FIG. 2 depicts a flow diagram of an adaptive rate control method suitable for use in the MPEG-like encoding system of FIG. 1.
Figure 2A:
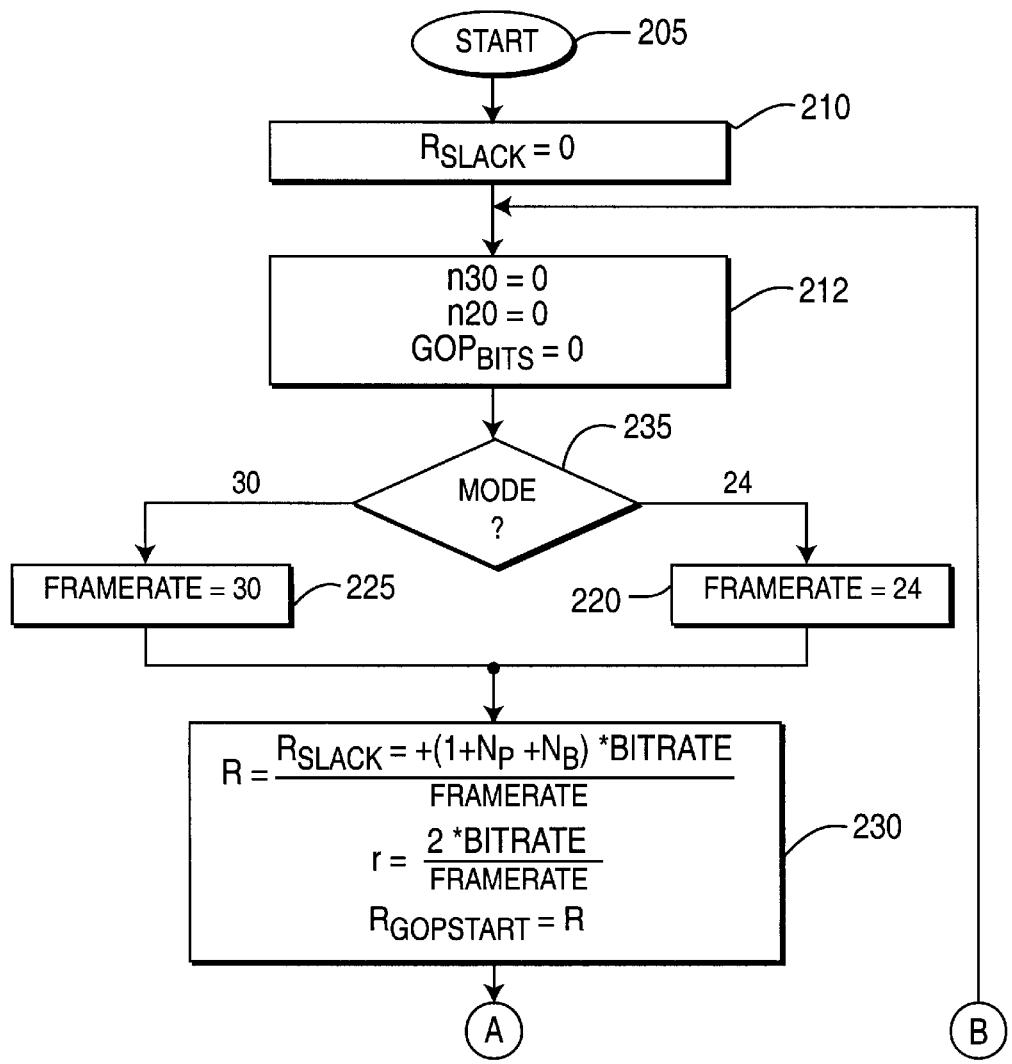
Figure 2B:
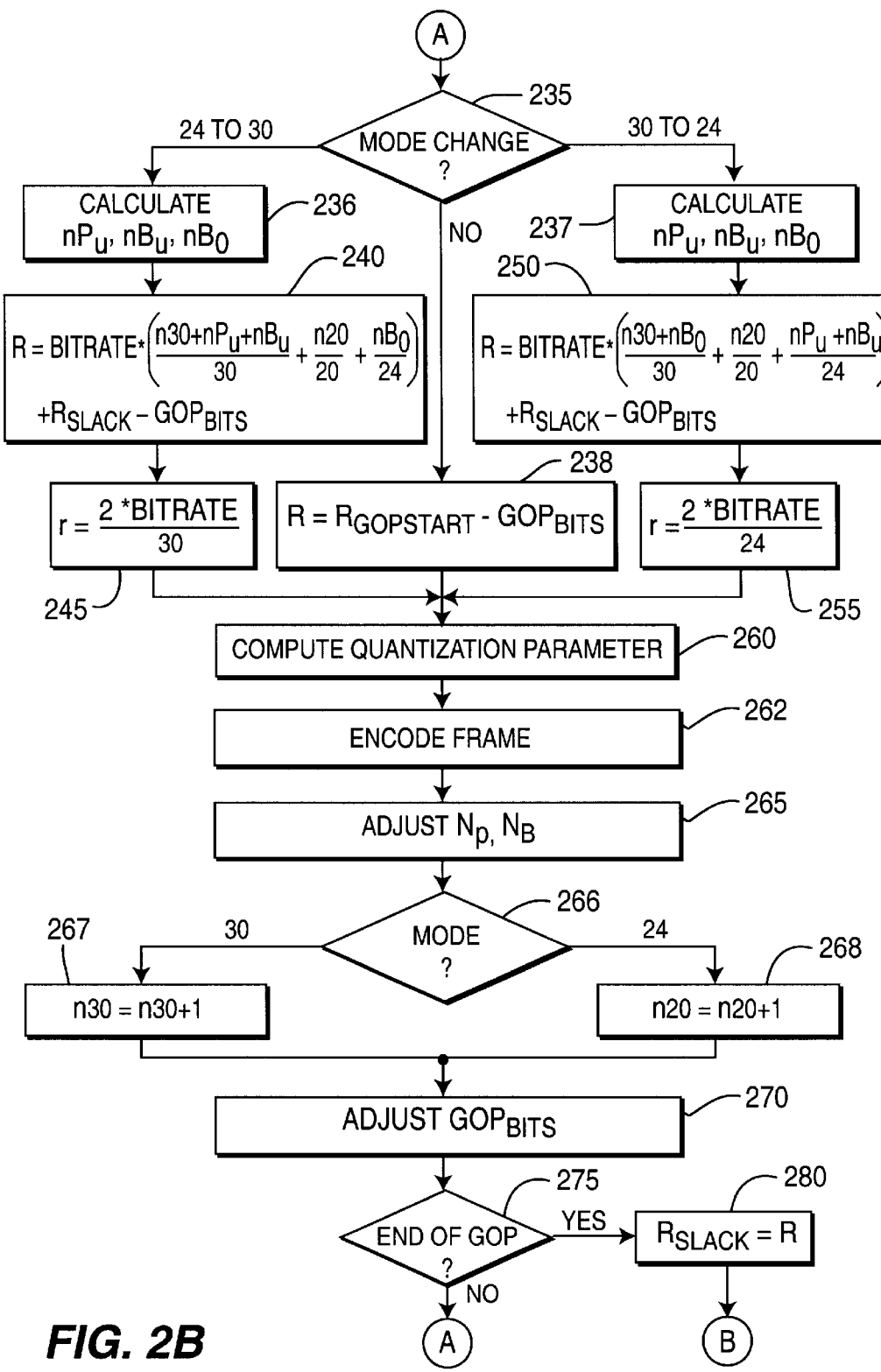

FIG. 2A and FIG. 2B together depict a flow diagram of an adaptive rate control method 200 suitable for use in the MPEG-like encoding system of FIG. 1. FIG. 2A and FIG. 2B are intended to be arranged in the manner diagrammatically depicted in FIG. 2A, such that the entire method 200 may be viewed together. The following discussion generally assumes that, irrespective of frame rate, the MPEG-like encoding system 100 operates to encode a received video information stream IN according to a predetermined group of pictures (GOP) information structure, where each GOP is allocated a predetermined number of bits (R) such that a constant bitrate output stream OUT is produced by the output buffer 160. That is, a distance N between two I-frames and a distance M between two consecutive reference frames remains the same throughout the encoding process. It is also assumed that a maximum of one mode change occurs between any two consecutive reference frames.

The rate control method 200 of FIGS. 2A and 2B modifies, in response to the detection of a change in mode (i.e., 24 fps←→30 fps) in the received video information stream IN, a rate control parameter (R) that is used by the TM-5 rate control algorithm to indicate the number of bits remaining in a GOP bit allocation. In this manner, a TM-5 rate control algorithm may be made to function properly in the presence of such a change in mode.

The method 200 is entered at step 205 when, e.g., the MPEG-like encoding system 100 of FIG. 1 receives a video information stream IN for encoding. The method 200 then proceeds to step 210, where a variable $R_{SLACK}$ is initialized to zero prior to processing the first GOP of a sequence of GOPs. The variable $R_{SLACK}$ is used to indicate a bit over/under run of the previously encoded GOP. That is, RSLACK indicates that a previous GOP was encoded with fewer bits (under-run) or more bits (over run) than allocated. As such, the presently processed GOP is encoded in a manner tending to correct (though not necessarily correcting) the previous over/under run. The method 200 then proceeds to step 212.

At step 212 three variables (n20, n30 and $GOP_{BITS}$) are initialized to zero. The first variable n20 is used to indicate the number of frames within a GOP being processed that are encoded during a 24 fps mode of operation. The second variable n30 is used to indicate the number of frames within a GOP being processed that are encoded during a 30 fps mode of operation. The third variable $GOP_{BITS}$ represents the total number of bits used thus far to encode video frames within the GOP being processed. This information will be utilized to dynamically update the duration of a GOP during a transition between modes of operation caused by a change in format of the video stream being encoded. The method 200 then proceeds to step 215.

At step 215 a query is made as to the mode of the received video information stream IN. That is, a query is made as to whether the input video stream IN presently comprises a native 30 fps video stream (e.g., a "standard" NTSC stream) or a native 24 fps video stream (e.g., a 24 fps movie processed according to the 3:2 pull-down process to form a 30 fps stream). An exemplary method for identifying the mode of the received information stream will be described below with respect to FIGS. 3, 4 and 5.

If the query at step 215 indicates that the received video information stream IN comprises 30 fps video material, then the method 200 proceeds to step 225, where a variable FRAMERATE is initialized to 30. The method 200 then proceeds to step 230. If the query at step 215 indicates that the received video information stream IN comprises 24 fps video material, then the method 200 proceeds to step 220, where the variable FRAMERATE is initialized to 24. The method 200 then proceeds to step 230.

At step 230 the number of bits (R) remaining in a group of pictures (GOP) to be processed is calculated according to equation 1 (below), and the TM-5 reaction parameter (r) is calculated according to equation 2 (below), where:

"R" is the number of bits remaining in the bit allocation for the current GOP;

"$R_{SLACK}$" is the bit over/under run of the previously encoded GOP;

"$N_P$" is the number of P-frames remaining in the present GOP;

"$N_B$" is the number of B-frames remaining in the present GOP;

"BITRATE" is the bitrate of the resulting encoded bitstream;

"FRAMERATE" is 24 or 30 per steps 215–225; and

"r" is a reaction parameter used in a TM-5 rate control algorithm.

$$R = R_{SLACK} + \frac{(1 + N_P + N_B)BITRATE}{FRAMERATE} \quad \text{(equation 1)}$$

$$r = \frac{2 \times BITRATE}{FRAMERATE} \quad \text{(equation 2)}$$

After calculating the number of bits remaining in the bit allocation for the current GOP (R) and the reaction parameter (r), a variable $GOP_{START}$ is set equal to the calculated value of R, and the method 200 proceeds to step 235, where a query is made as to whether a change in mode has occurred (i.e., 24 fps→30 fps or 30 fps→24 fps). If the query at step 235 indicates that a mode change from 24 fps mode to 30 fps mode has occurred, then the method 200 proceeds to step 236. If the query at step 235 indicates that a mode change from 30 fps mode to 24 fps mode has occurred, then the method 200 proceeds to step 237. If the query at step 235 indicates that a mode change has not occurred, then the method 200 proceeds to step 238.

At step 238 the variable R is set equal to $GOP_{START}$-$GOP_{BITS}$. That is, the number of bits remaining in the GOP bit allocation (R) is set equal to the initial bit allocation ($GOP_{START}$) minus the number of bits used ($GOP_{BITS}$). The method 200 then proceeds to step 260.

At step 260, a quantization parameter(s) is computed for each of the macroblocks forming the presently processed video frame within presently processed GOP. The method 200 then proceeds to step 262.

At step 262 the frame is encoded according to, e.g., the TM-5 rate control algorithm. Optionally, the group of pictures (GOP) structure used to determine the type of frame to be encoded is modified according to the method of FIG. 2C, which will be described in more detail below.

The method 200 then proceeds to step 265, where the value of variables $N_P$ (the number of P-frames remaining in the present GOP) and $N_B$ (the number of B-frames remaining in the present GOP) are adjusted as necessary. The method 200 then proceeds to step 266.

At step 266 a query is made as to the present encoding mode, i.e., was the frame encoded at step 262 a 24 fps or 30 fps native mode frame?. If the answer to the query at step 266 indicates that the frame encoded at step 262 was a 30 fps frame, then the method 200 proceeds to step 267, where the variable n30 is incremented by one. The method 200 then proceeds to step 270. If the answer to the query at step 266 indicates that the frame encoded at step 262 was a 24 fps frame, then the method 200 proceeds to step 268, where the variable n20 is incremented by one. The method 200 then proceeds to step 270.

At step 270, the variable $GOP_{BITS}$ is adjusted. The variable $GOP_{BITS}$ represents the total number of bits used thus far to encode video frames within the GOP being processed. Thus, the value of $GOP_{BITS}$ is increased by the amount of bits (including header information and other bit consuming information) used to process the most recent frame in the GOP being processed. The method 200 the proceeds to step 275.

At step 275 a query is made as to whether the most recently encoded frame is the last frame of the GOP being processed (i.e., the end of GOP frame). If the query at step 275 is answered negatively, the method 200 proceeds to step 215.

If the query at step 275 is answered negatively, the method 200 proceeds to step 280, where a variable $R_{SLACK}$ is set equal to R. Since R represents the number of bits remaining in the bit allocation for the GOP being processed, and since the GOP is now processed, any non-zero value for R represents an under-utilization (R>0) or over-utilization (R<0) of the allocated bit budget. This over/under flow of bit allocation is added to any over/under flow remaining from previously encoded GOPs such that the available bandwidth may be maximally utilized during the encoding process. For example, an underutilized bit budget may be used by encoding the I-frame of the next GOP with an increased number of bits, reducing the quantizer step sizes in subsequent quantized video frames and by other known methods for qualitatively enhancing the encoding process. The method 200 then proceeds to step 212.

At either of steps 236 and 237, the value of three variables is computed. Specifically, a first variable nBu is equated to a value indicative of the number of B-frames that remain to be coded in the new mode of operation (i.e., the mode entered after detection of a mode change); a second variable nPu is equated to a value indicative of the number of P-frames that remain to be coded in the new mode of operation; and a third variable nBo is equated to a value indicative of the number of B-frames that remain to be coded in the old mode of operation (i.e., the mode prior to the detection of a mode change). After performing step 236, the method 200 proceeds to step 240. After performing step 237, the method 200 proceeds to step 250.

At step 240 the number of bits (R) remaining in the GOP currently being processed is calculated according to equation 3 (below), while at step 250 the number of bits (R) remaining in the GOP currently being processed is calculated according to equation 4 (below), where:

"n20" is the number of frames within the present GOP that were encoded during the 24 fps mode of operation;

"n30" is the number of frames within the present GOP that were encoded during the 30 fps mode of operation;

"nBu" is the number of B-frames that remain to be coded in the new mode (i.e., after detection of a mode change);

"nPu" is the number of P-frames that remain to be coded in the new mode; and

"nBo" is the number of B-frames that remain to be coded in the old mode.

$$R = BITRATE \times \frac{n30 + nPu + nBu}{30} + \frac{n20}{20} + \frac{nBo}{24} + R_{SLACK} - GOP_{BITS} \quad \text{(equation 3)}$$

$$R = BITRATE \times \frac{n30 + nBo}{30} + \frac{n20}{20} + \frac{nPu + nBu}{24} + R_{SLACK} - GOP_{BITS} \quad \text{(equation 4)}$$

After calculating the number of bits (R) remaining in the GOP currently being processed in step 240, the method 200 proceeds to step 245, where the reaction parameter (r) is calculated according to equation 5 (below). The method then proceeds to step 260.

$$r = \frac{2 \times BITRATE}{30} \quad \text{(equation 5)}$$

After calculating the number of bits (R) remaining in the GOP currently being processed in step 250, the method 200 proceeds to step 255, where the reaction parameter (r) is calculated according to equation 6 (below). The method then proceeds to step 260.

$$r = \frac{2 \times BITRATE}{24} \quad \text{(equation 6)}$$

The above-described bit allocation method is based on a quadratic rate model that can be solved in closed form, as noted above with respect to equations 1 through 6. Advantageously, the bit allocation method of FIG. 2 provides more accurate frame level target bit allocations than achieved using the conventional TM5's linear model. The above-described method provides less buffer fluctuation and uniform quality over time by properly distributing bits across I-, P- and B-frames. In this manner the conventional "pulsing" artifact due to varying quality across I-, P-, and B-frames that is common in commercial encoders at low bit-rates is avoided. Moreover, by utilizing tele-cine conversion (i.e., removal of 3:2 pull-up processing), 24 fps bit allocation, and adapting the GOP structure and bit allocation at scene transitions, the control signals provided by the rate controller 140 to the encoder 104 ensures that the resulting encoded video stream efficiently utilizes the available bit budget while providing smooth inter-scene transitions and inter-frame bit allocations.

Figure 2C:
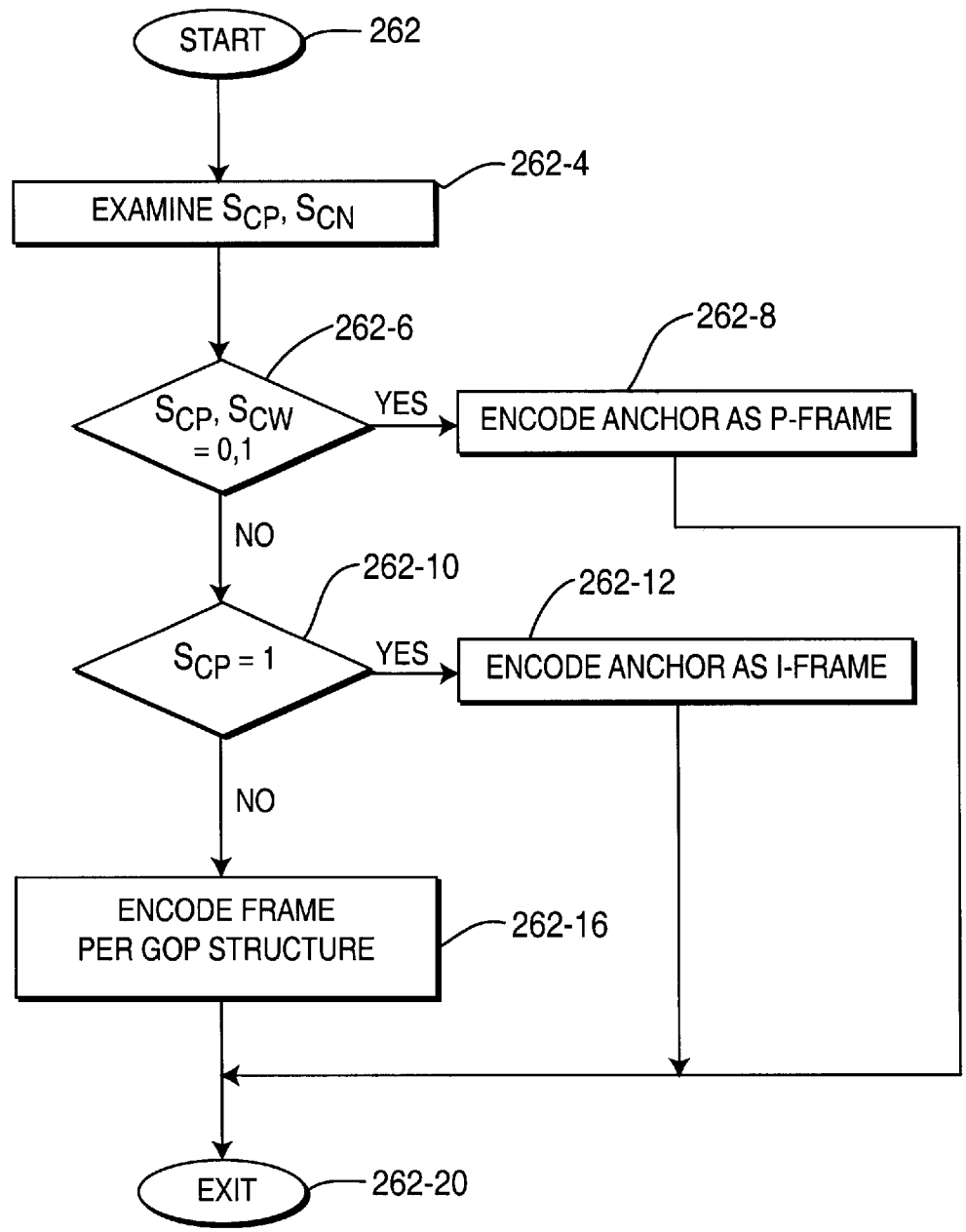

FIG. 2C depicts a flow diagram of a method 262 for adaptively modifying the predetermined group of pictures (GOP) information structure in response to the presence or absence of an information discontinuity (such as a scene change). Specifically, the method 262 of FIG. 2C adapts the predefined GOP structure in a manner tending to avoid the encoding of closely proximate I-frames, such as may occur in response to a scene change. That is, an anchor frame within a final sub-GOP of a scene is encoded as a P-frame, rather than an I-frame, while a first anchor frame in a next scene is encoded as an I-frame, thereby utilizing the bit budget allocated to the GOP in a more efficient manner.

The GOP method 262 is entered at step 262-2 when, e.g., the rate control method 200 of FIG. 2 executes step 262 (i.e., a frame is to be encoded). The method 262 then proceeds to step 262-4, where the status of the scene change control signals SCP and SCN are examined. The method 262 then proceeds to step 262-6.

At step 262-6 a query is made as to whether the control signals SCP and SCN are equal to, respectively, zero and one. If the query at step 262-6 is answered affirmatively (a scene change occurred in the present sub-GOP), then the method 262 proceeds to step 262-8. If the query at step 262-6 is answered negatively, then the method 262 proceeds to step 262-10.

At step 262-8 the anchor frame of the present sub-GOP is encoded as a P-frame. The method 262 then proceeds to step 262-20 where it is exited.

At step 262-10 a query is made as to whether the control signal SCP is equal to one. That is, a query is made as to whether the control signal SCP indicates that a scene change occurred in the previously encoded sub-GOP. If the query at step 262-10 is answered affirmatively, then the method 262 proceeds to step 262-12, where the anchor frame of the present sub-GOP is encoded as an I-frame. The method 262 then proceeds to step 262-20 where it is exited. If the query at step 262-10 is answered negatively, then the method 262 proceeds to step 262-16.

At step 262-16 the anchor frame of the present sub-GOP as per the GOP structure. If the frame to be encoded is not an anchor frame, then the frame is encoded per the GOP structure. The method 262 then proceeds to step 262-20 where it is exited.

The method of FIG. 2C requires that a sub-GOP of information be buffered by, e.g., the sub-GOP buffer 184. In one embodiment of the invention, such a sub-GOP buffer is not used. This embodiment utilizes the teachings of U.S. patent applications Ser. No. 09/105,730, filed Jun. 26, 1998, which is incorporated herein by reference in its entirety. Specifically, in one embodiment of the invention lacking a sub-GOP buffer, each anchor frame is encoded as both an I-frame and a P-frame. In the event of a scene change, the P-frame is used as the anchor frame, while the next anchor frame is encoded as an I-frame. In another embodiment of the invention lacking only an input sub-GOP buffer, an output sub-GOP buffer is used to store an encoded sub-GOP. In the event of a scene change, the anchor frame stored in the output sub-GOP buffer is re-encoded as necessary to provide for a P-frame within the last sub-GOP of a scene and an I-frame within the first sub-GOP of a new scene.

Figure 3:
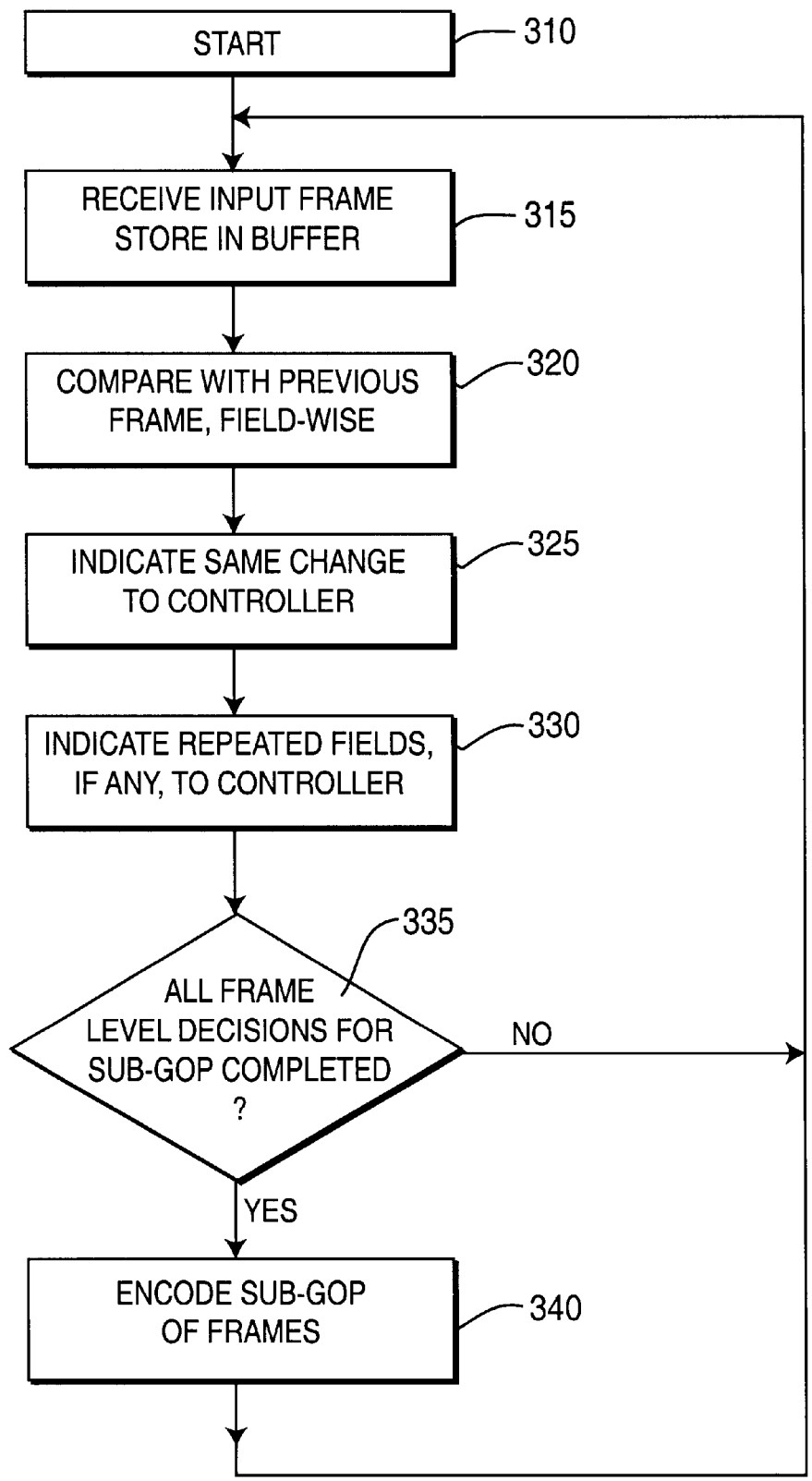
FIG. 3 depicts a flow diagram of a method suitable for use in the MPEG-like encoding system of FIG. 1.

FIG. 3 depicts a flow diagram of method suitable for use in the MPEG-like encoder 100 of FIG. 1. Specifically, the method 300 of FIG. 3 is used to control the encoding of plurality of received information frames forming a sub-GOP. The method 300 is entered at step 310 and proceeds to step 315.

At step 315 an information frame, e.g., a video information frame, is received from the input information stream IN and stored in the sub-GOP storage buffer 184. The method 300 then proceeds to step 320.

At step 320 the information frame received at step 315 is compared with a previously received information frame on, e.g., a field-wise basis. That is, the top field of the previous information frame (i.e., the second to last video frame received) is compared to the top field of the received information frame (i.e., the last video frame received). Similarly, the bottom field of the previous information frame is compared to the bottom field of the received information frame. The results of this comparison are used to change the state of the control signals SCP and SCN produced by the 3:2 pull down processor 181 of the pre-processor 101, as previously described with respect to FIG. 1. The method 300 then proceeds to step 325.

At step 325 the presence or absence of a scene change is indicated to the controller. That is, the scene change detector 182 of the pre-processor 101 is utilized in the manner described above with respect to FIG. 1 to produce the scene change indicative control signals SCP and SCN. The method 300 then proceeds to step 330.

At step 330 the repetition of any fields within an input video stream is indicated to the controller. That is, the 3:2 pull down processor 181 of the pre-processor 101 utilizes the information derived in the field-wise comparison step 320 to determine whether any fields have been repeated, on a frame-to-frame basis. A repetition of a top field is indicated by the control signal $R_{13}$ TOP, while the repetition of a bottom field is indicated by the control signal $R_{13}$ BOT. The method 300 then proceeds to step 335.

At step 335 a query is made to determine if all frame level decisions for a sub-GOP of frames have been completed.

That is, a determination is made as to whether the input frames stored in the sub-GOP buffer 184 have been processed such that any scene change or 3:2 pull down information has been determined with respect to each frame of an entire sub-GOP. If the query at step 335 is answered negatively (i.e., the stored sub-GOP has not been fully processed) then the method 300 proceeds to step 315, where the next input frame of the sub-GOP is received and stored in the sub-GOP buffer. If the query at step 335 is answered affirmatively, then the method 300 proceeds to step 340.

At step 340 the sub-GOP of information frames stored at sub-GOP buffer 184 is coupled to the encoder 104 where it is encoded. The encoding of the coupled sub-GOP is performed according to the methods described elsewhere in this disclosure. The method 300 then proceeds to step 315, where the first information frame of the next sub-GOP is received and stored in the sub-GOP buffer 184.

As previously mentioned, a 3:2 pull-down detection method utilizing inter-field luminance or chrominance differencing suitable for use in the MPEG-like encoding system of FIG. 1 is described in more detail in U.S. patent application Ser. No. 09/151,425. To hasten field differencing computations, and to reduce memory bandwidth, the disclosed differencing techniques (referred to as a luma repeat field detector) optionally compares two fields according to the following method: First, the sum of absolute difference (SAD) within, e.g., consecutive luminance fields of the same parity along one row in each macroblock (e.g., one macroblock=8 rows×16 pixels.) is computed. Second, if the computed sum of absolute difference (SAD) is greater than an upper threshold level T_MB_HIGH, then the second field is not a repeat of the first field and the method terminates. Third, if the computed SAD is less than the upper threshold level T_MB_HIGH, then proceed to the next macroblock in the field and repeat steps one to three. Fourth, if the computed SAD less than or equal to the upper threshold level T_MB_HIGH and greater than or equal to a lower threshold level T_MB_LOW, then compute SAD over the entire macroblock. Fifth, the SAD is greater than a threshold over a macroblock T_MB, then the second field is not a repeat of the first field. Otherwise, proceed to the next macroblock and repeat the above steps. Finally, if all the macroblocks are processed and the total SAD does not exceed a threshold over a frame T_FR, then the second field is a repeat of the first field.

Such multi-tier thresholding reduces the probability of false alarms. Also, the thresholds allow us to account for transcoding errors which might prevent the fields from being exact repeats. The thresholds can be arrived at empirically based on a large set of 3:2 pulled-down material.

After pre-processing the received sub-GOP, the information frames within the pre-processed input information stream IN' are coupled to the encoding module 104 and the second preprocessor 102.

Returning to FIG. 1, the second pre-processor 102 receives and processes the pre-processed input information stream IN' to produce a pyramid information stream PG and, optionally, a block classification stream BC. The second pre-processor 102 includes the following functional components: a pyramid generator 102-2, an optional data packer 102-3, and an optional block classifier 102-4.

The pyramid generator 102-2 spatially decomposes the frames within the pre-processed input information stream IN' to derive a low pass pyramid for frame, odd field and even field. Then, by subtracting the upsampled lower levels, a detail pyramid is created. The detail pixels are quantized to two levels and represented using a single bit per pixel. This significant reduction in the number of bits used to represent the pixel values translates into a reduction in computational overhead in, e.g., a motion estimation process within the encoding module 104. For example, a block matching operation performed in the motion estimation process can be accelerated since there are fewer possible values that a pixel value can take on, thereby simplifying the overall block matching process.

The optional data packer 102-3 is used to pack the data representation of the resulting pyramid using a packing strategy discussed below with respect to FIGS. 9–12. The optional data packer 102-3 is used to reduce the amount of memory resources utilized in, e.g., the motion estimation process within the encoding module 104. Briefly, mean and/or M-ary data is "packed" into defined data words in order to achieve computation and memory-bandwidth requirements. That is, data representative of an M-ary pyramid is arranged in a very specific manner such that subsequent storage, retrieval and processing operations may be performed in an efficient manner. For example, a single 32-bit word may be used to represent an entire row of pixels within a pixel block of a pyramid. In this manner, the overall size of the pyramid used for motion estimation is considerably reduced (by factor ranging from 4–8).

If the optional data packer 102-3 is used, then a packed data representation should be used in other portion of the MPEG-like encoding system 100 of FIG. 1. Specifically, the encoding module 104 must be able to process the packed data representation of the pyramid information stream PG.

The optional block classifier 102-4 is used to classify blocks and macroblocks such that block and macroblock comparisons made during, e.g., the motion estimation process, may be made more efficiently. For example, blocks may be classified in terms of "activity level," where the level of activity is related to the number of non-zero pixels, the range or statistical distribution of the pixels or some other parameter.

Figure 7:
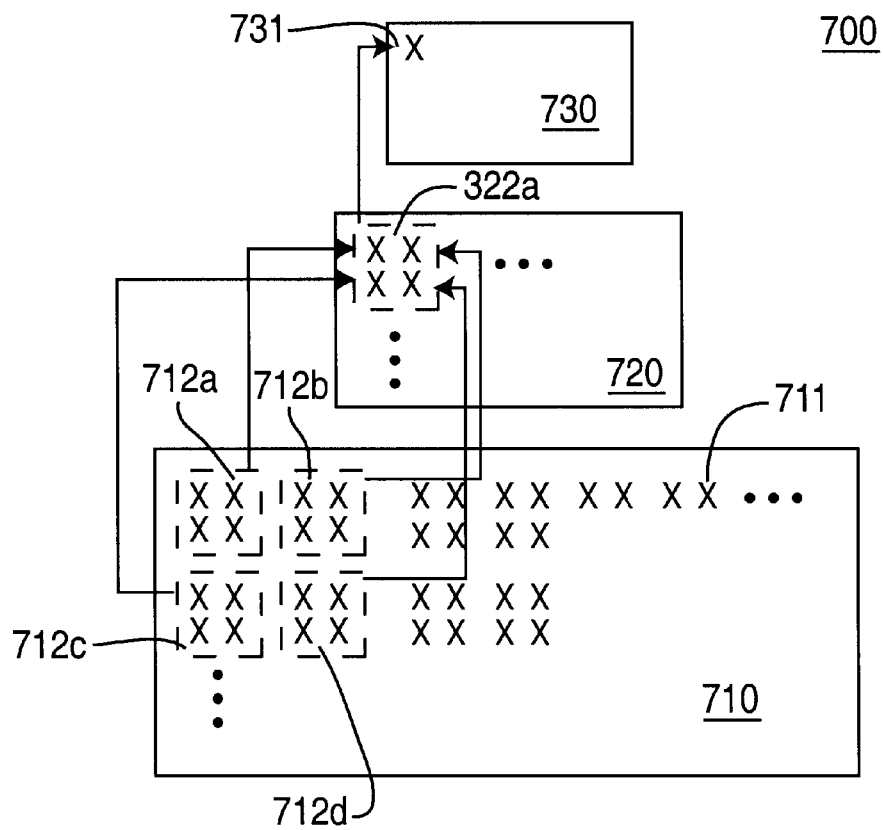
FIG. 7 is a graphical representation of the quantization process used to generate mean pyramid.

FIG. 7 is a graphical representation of the quantization process used to generate a mean pyramid 700, where the mean pyramid comprises a plurality of levels 710, 720 and 730. The lowest level 710 is an original image frame from the image sequence having a plurality of pixels 711 represented by "x"'s. Typically, these pixels are represented by pixel values having a range that is limited by the number of bits allocated to represent the pixel values. For example, if eight (8) bits are allocated, then a pixel value may take a value from one of 256 possible values.

In a mean pyramid, a next higher level is generated by lowpass filtering and down sampling by a factor of two in both directions, thereby generating a single pixel value (parent) for a higher level from four (4) pixel values (children) in a lower level. This is illustrated in FIG. 7, where each set of four pixels 712a–d is used to generate a single pixel value 721 in level 720. In turn, the set of four pixel values 722a is used to generate a single pixel value 731 in level 730 and so on. It should be understood that the present invention is not limited to a mean pyramid having three levels. The number of levels is generally limited by the size of the image and the downsampling factor selected to generate the next lower resolution image. Thus, the number of levels in the mean pyramid can be selected for a particular application.

In a mean pyramid, the parent pixel value is derived by taking the average of its four children pixel values, thus the term mean pyramid. However, other measure or metric can be used to generate other types of pyramids, e.g., the measure can be based on the median of the four children pixel values. Alternatively, a larger area around the children pixels can be used for a weighted average to obtain a general lowpass pyramid.

In a M-ary pyramid, the pixel values are quantized such that each quantized pixel value can only take "M" possible pixel values. For example, if M equals to two (2), then each quantized pixel value, can take on a value of 0 or 1, i.e., resulting in a "binary pyramid".

Figure 8:
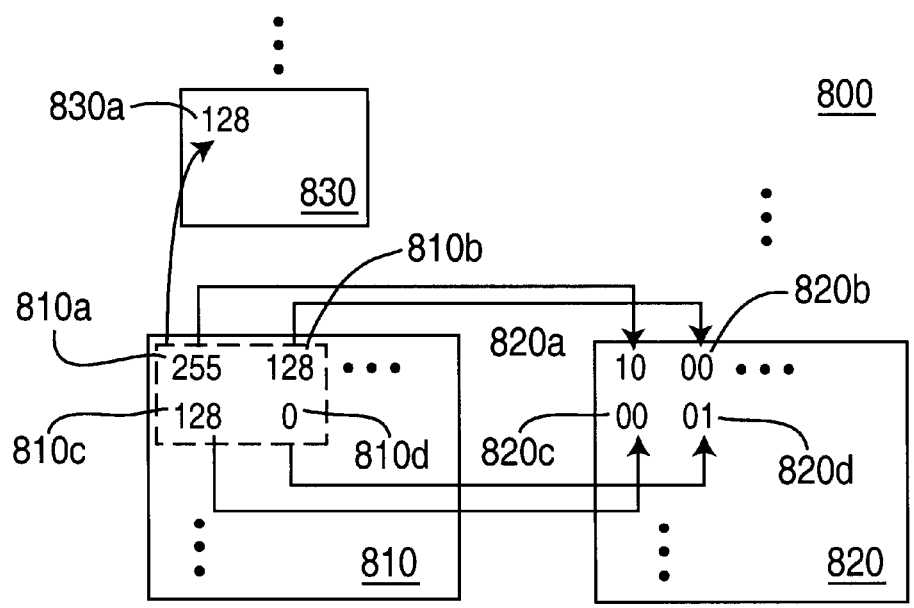
FIG. 8 is a graphical representation of the quantization process used to generate a ternary pyramid, where M equals three.

FIG. 8 is a graphical representation of the quantization process used to generate a ternary pyramid, where M equals to three (3). More specifically, an eight-bit pixel value 255 (810a) is quantized into a two-bit pixel value 10 (820a) based on the difference between the child and parent pixels. Namely, a difference is computed between a parent 830a and each of its children 810a–d, where each of the four (4) differences is then quantized into three possible values 10, 00, and 01. Thus, pixel value 128 (810b and 810c) is quantized into a pixel value 00 (820b and 820c) and pixel value 0 (810d) is quantized into a pixel value 01 (820d). These representation levels are suitable for the bit wise XOR based cost function that will be used for motion estimation. They are also useful for feature detection and block classification. The M-ary pyramid reduces accuracy of the pixel values, thereby allowing rapid detection of "features" within an image.

Features are defined as areas of high activities or intensity, e.g., the edges of an object. It should be noted that the levels 810 and 830 are levels of a mean pyramid, while level 820 is a level of a M-ary pyramid (where M=3). Both of these pyramids may have additional levels as illustrated in FIG. 8, but the M-ary pyramid will always have one level less than the mean pyramid. Namely, one needs two mean pyramid levels 810 and 830 to generate a single M-ary pyramid level 820.

Although M can be any positive integer value, it has been found that a binary pyramid decomposition is sensitive to noise. Namely, since the quantized pixel values can only take one of two possible values, noise can introduce errors, where a pixel value can be erroneously interpreted as having a value 1 instead of 0 or vice versa. Such over sensitivity causes erroneous interpretation of the presence or absence of a feature. Thus, it has been found that a M-ary pyramid decomposition is best employed when M is greater than 2.

Alternately, M-ary mean pyramid decomposition can be expressed in equation form. Let (i, j) represent the pixel locations on an image frame and let I(i, j) represent the intensity at location (i, j). Further, let 1 indicate the level within a pyramid, with 0=l=L, where L is the highest level in the pyramid. Then, the mean pyramids $X^l(i, j), 1=l=L$ are constructed as follows:

$$X^l(i, j) = \frac{1}{4} \sum_{m=0}^{1} \sum_{n=0}^{1} X^{l-1}(2i+m, 2j+n) \quad \text{(equation 7)}$$

where $X^0(i, j) = I(i, j)$.

From these mean pyramids, features within a block can be extracted, as noted below with respect to FIG. 6. In the preferred embodiment, the block is a 8×8 sub-block of a macroblock, but it should be understood that the present invention is not limited to this block size. In particular, features like edges can be extracted from the variation of intensities within a block. This variation is represented by calculating the difference between the mean value at a level l, 0=l=L−1 and the mean value at level l+1. However, in order to obtain a robust feature, and in order to facilitate fast motion estimation, this difference is quantized using M levels and represent the quantized values using $\log_2 M$ bits. This will create a pattern over the image that is used to identify image features like edges and zero-crossings. Denoting this pattern value by $Y^l(i, j)$:

$$Y^l(i, j) = Quant\left[X^l(i, j) - X^{l+1}\left(INT\left(\frac{i}{2}\right), INT\left(\frac{j}{2}\right)\right)\right], \quad \text{(equation 8)}$$

$$0 \le l \le L-1$$

Denote the argument of Quant[?] by $\lambda$. For example, consider the case of ternary pyramids having a threshold T, and define $Y^1(i, j)$ as follows:

$$Y^l(i, j) = \begin{cases} 00 & |\lambda| < T \\ 01 & \lambda > T \\ 10 & \lambda < -T \end{cases} \quad \text{(equation 9)}$$

This definition has the advantage of noise-robustness if the quantization threshold T (e.g., in the preferred embodiment T is selected to 5) is suitably chosen for a particular application. Namely, it is possible to define a "dead zone", e.g., $|\lambda| < T$, where slight variations in the pixel values due to noise can be removed effectively. Thus, any M-ary pyramids (M>2) having a dead zone around zero will minimize the noise sensitivity problem as seen in the binary pyramid.

In relatively flat areas (areas of low activities), $Y^1(i, j)$ will contain a large number of zeros (0), while in regions containing edges, $Y^1(i, j)$ will contain a number of ones (1). Once the input image is decomposed into a M-ary pyramid, the blocks in the input image can be classified for the purpose of feature extraction using the M-ary pyramid, $Y^1(i, j)$. Namely, the M-ary pyramid can be used to rapidly detect features in the input image without incurring a high computational overhead. The detected features can be used to enhance the motion estimation process as discussed below or other image processing steps, e.g., segmentation of areas (such as objects) within an image, e.g., by using segmentation module 151. Segmentation is an important image processing step, where important areas in the image can be identified to receive special treatment. For example, the face of a person during a video conferencing application may demand special image processing such as receiving a greater allocation of coding bits. Additionally, segmentation can be employed to identify large objects where global motion estimation can be performed on these large objects.

It should be understood that the preceding discussion uses the ternary pyramid as an example and shows one possible method in which the quantization thresholds or levels can be assigned for feature identification and classification. In general, M-ary pyramids with M>2 can be used with the specific assignment of the quantization threshold's being dependent on the requirement of a particular application and/or the content of the image sequence.

Figure 6:
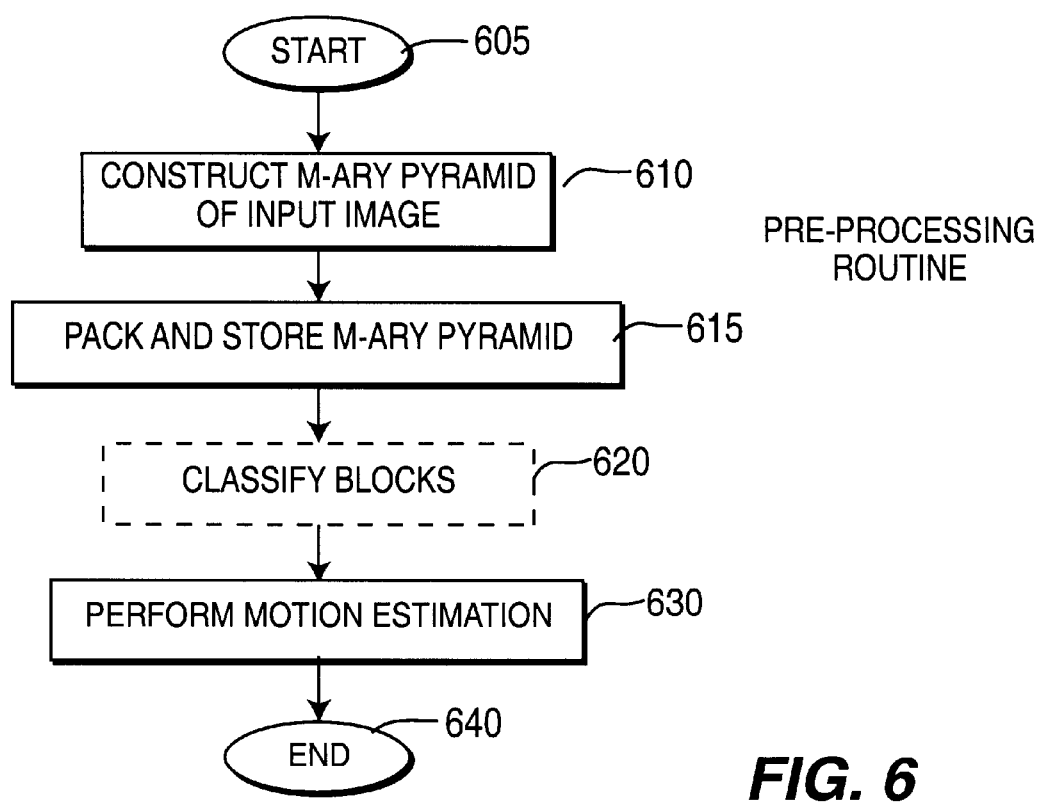
FIG. 6 illustrates a flow diagram of a method for reducing the computational complexity in determining motion vectors for block-based motion estimation.

FIG. 6 illustrates a flow diagram of a method for reducing the computational complexity in determining motion vectors for block-based motion estimation. Namely, the method 600 enhances a block-based motion estimation method by quickly defining an initial search area where a match will likely occur.

More specifically, the method 600 starts at step 605 and proceeds to step 610, where an M-ary pyramid (or M-ary mean pyramid) is generated for each image frame in the image sequence within the pre-processed input information stream IN'. It should be understood that an important aspect in step 610 is the generation of a M-ary pyramid for each of the input images in the image sequence. As such, although the preferred embodiment generates a M-ary mean pyramid, other types of M-ary pyramids can be employed in the present invention, e.g., a M-ary median pyramid, M-ary Lowpass pyramid and so on. The method 600 then proceeds to optional step 615.

At optional step 615, the M-ary pyramid generated at step 610 is packed and stored for subsequent use by, e.g., the motion estimation process of the encoding module 104. The packing and storing of the M-ary pyramid data will be discussed in detail below with respect to FIGS. 9–12. Additionally, suitable methods are disclosed in U.S. patent application Ser. No. 09/196,072, filed Nov. 19, 1998, which is incorporated herein be reference in its entirety. The method 600 then proceeds to optional step 620.

At optional step 620, the blocks in the frame are classified in terms of low activity or high activity in view of the M-ary pyramid. In the preferred embodiment, the "classification block size" is a 8×8 block having 64 M-ary pixel values represented by 128 bits. An "activity threshold" of 25 is set where the 8×8 block is classified as a high activity block if 25 or more pixel values are nonzero. Otherwise, the 8×8 block is classified as a low activity block. Additional higher block classification can be performed, e.g., classifying a macroblock as either a high activity or low activity macroblock. In the preferred embodiment, a macroblock comprising at least one sub-block that is classified as high activity, causes the macroblock to be classified as high activity as well. It should be understood that the "classification block size" and the "activity threshold" can be adjusted according to a particular application and are not limited to those values selected in the preferred embodiment. The method 600 then proceeds to optional step 630.

At step 630, the block classifications are used to enhance the motion estimation process of the encoding module 104. Generally, motion estimates in areas with significant image features are more reliable than motion estimates in relatively "flat areas" with little changes due to the aperture problem (e.g., uniform areas where the content of the image are very similar for adjacent blocks). Therefore, the classification method described above is used to increase the reliability of motion estimates in general. Namely, it should be understood that the present invention can be employed to enhance the performance of various types or different architectures of motion estimation methods.

More specifically, motion estimation is generally performed on a block by block basis in a raster scan order. The computational overhead or cost is generally evenly distributed over all the blocks during the motion estimation process. In the present invention, motion estimation in the edge blocks (high activity blocks) can be performed first using a cost function that depends on $Y^1(i, j)$, and/or $X^1(i, j)$. This approach allows the emphasis of the features in the image and provide robust, reliable motion estimates in the presence of sensor noise, quantization noise, and illumination changes. An example of a cost function could involve a bit-wise XOR operation on the M-ary levels in the pyramid, which can be implemented as a fast method on certain architectures. The cost function is used to determine the "best match". Let us consider a M-ary valued block at time t (current frame), $Y^1(i, j, t)$ and another M-ary valued block at time t-1 (previous frame) $Y^1(m,n,t-1)$. The cost function is then expressed as:

$$\sum_{\substack{pixels\ within \\ the\ block}} \text{Number of ones in } \{Y^l(i, j \cdot t) \otimes Y^l(m \cdot n, t-1)\} \quad \text{(equation 10)}$$

where $\otimes$ represents a bitwise XOR operation.

This cost function produces substantial computational savings compared to the standard "absolute difference" cost function used on the original 8-bit pixel intensity values. This procedure is performed hierarchically over the M-ary pyramid. In other words, the motion estimation method is initiated at the high activity blocks.

Consider the case of an input image frame which has been divided into a plurality of blocks, two of which have been classified as high activity blocks. As such, motion estimation is performed on these two blocks first. In fact, the computational cost can be increased for these two blocks, since these high activity blocks (high-confidence edge blocks), will most likely provide very high accuracy motion vectors. Thus, more intensive motion estimations are performed on these two blocks than on other blocks in the input image frame. For example, the two high activity blocks can be split to obtain more accurate motion vectors, "half pel" motion estimation can be performed in these two blocks or finer search strategies may be employed.

In turn, after motion estimation is completed for the high activity blocks, the motion estimation will then propagate to the low activity blocks ("Low-confidence" blocks) in the image. However, this propagation is done intelligently depending on the region or object segmentation that is obtained from the classification. This propagation is performed by using the motion of the edge blocks as an initialization for the motion of adjacent blocks, and using a relatively small search-range to refine this initialization. Namely, the motion estimation process propagates (e.g., in a spiraling order) to blocks proximate to the high activity blocks. In turn, this propagation strategy is then extended to flat blocks that are not adjacent or proximate to an edge block.

Thus, the motion estimation search range is refined rapidly and with a relatively low computational complexity. Furthermore, the resulting motion estimates will be smoother and easier to encode, providing a major advantage in very low bit rate (VLBR) applications where motion information forms a significant portion of the bit-stream. Furthermore, these smoother motion estimates can be expected to perform better in a temporal interpolation application. Finally, the classification method also produces computational savings when half-pel refinements are used to increase accuracy of motion estimation, since the half-pel refinements are performed only on the edge blocks, and not on the relatively flat areas of the image.

To further reduce the memory resource requirements of the MPEG-like encoder of FIG. 1, an embodiment of the invention provide four main components, namely: 1) the creation of mean and/or M-ary pyramids; 2) the packing and storage in memory of data representative of the created mean and M-ary pyramids; 3) the moving of the packed data into registers for use in arithmetic calculations; and 4) the use of the data for matching error calculations. The four main components will now be discussed.

The first of the four main components comprises the creation of mean and/or M-ary pyramids. Since the previous portion of this disclosure identifies method and apparatus suitable for creating mean and/or M-ary pyramids, such creation will not be discussed in additional detail. However, to appreciate the reduction in computational complexity achieved by the invention, it is important to understand the computational load required to create a mean or M-ary pyramid. An illustrative example will now be presented.

Assume that a video stream is decomposed into J+1 levels, with level 0 being the finest and level J being the coarsest. For an MPEG-2 main profile @ main level video stream, a typical value for J would be 3. If P is the number of pixels at level 0, then the number of pixels at level J is $P/4^J$.

For the mean pyramid, at any particular level J except J=0, the computations necessary to produce the values for a particular level comprise three additions and one shift per-pixel. For J=0, the mean pyramid is the original image itself and requires no computations. Thus the total number of operations to generate it is 4/3*P, in the limit where J is large.

For the M-ary pyramid, at any particular level J including J=0, the computations necessary to produce the values for a particular level also comprise three additions and one shift per-pixel. That is, the M-ary pyramid requires computations at all levels from 0 to J−1. Furthermore, for each pixel it is necessary to perform M−1comparisons. Thus the number of computations is 4/3*P*(M−1) in the limit of large J.

The second of the four main components comprises the packing and storage in memory of data representative of the created mean and M-ary pyramids. The motion estimation scheme utilized by at least one embodiment of the invention relies on the "packing" of, e.g., M-ary data into defined data words in order to achieve computation and memory-bandwidth requirements. That is, data representative of an M-ary pyramid is arranged in a very specific manner such that subsequent storage, retrieval and processing operations may be performed in an efficient manner. This "packing" of the M-ary data is crucial to a fast software implementation of a method of the present invention as used in a general microprocessor or computer architecture.

The exact packing depends on the block-size for motion estimation, on M, the number of states at each pixel, and the register size for the particular architecture. For example, a common pixel block size (i.e., an N1×N2 block where N1 indicates the number of rows and N2 indicates the number of columns) is a 16×16, 16×8 or 8×8 pixel blocks (i.e., N2=16 or N2=8). The number of bits used to represent the M levels is N, and N depends on the exact way in which a distortion is calculated.

Distortion is a measure of the dissimilarity between two pixel blocks. For example, the distortion between a pixel block to be encoded and a reference pixel block may be calculated by performing a logical exclusive OR (XOR) operation between the two blocks. The distortion is equal to the number of "ones" resulting from the XOR operation. If there are no ones (i.e., the distortion is equal to zero) then the pixel blocks are exact matches. If there are many ones, e.g., more than a threshold level, then the pixel blocks do not match. If the number of ones is less then the threshold level, then the pixel blocks are very similar, though not exact matches. When distortion is calculated in this manner, N may be as large as M−1. For M=3, N=2 is typically sufficient.

Figure 9:
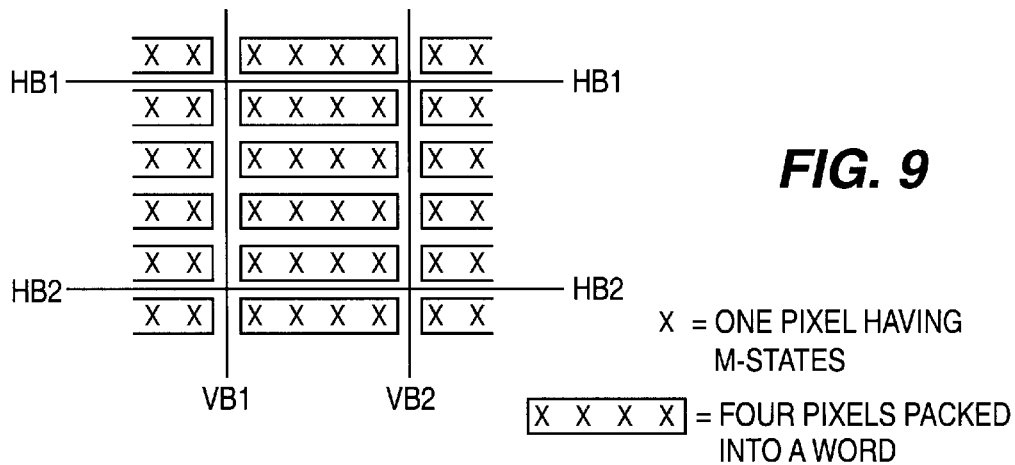
FIGS. 9–12 illustrate packed or blocked data representations of pixel information useful in understanding the present invention.

FIG. 9 illustrates a packed or blocked data representations of pixel information useful in understanding the present invention. Specifically, FIG. 9 shows a plurality of pixel blocks, each pixel block being represented by a plurality of respective words (illustratively four words), each word including information representing a plurality of pixels (illustratively four pixels). The blocks are delineated by vertical demarcations VB1 and VB2 and horizontal demarcations HB1 and HB2. Each "x" represents a single pixel having M states, and each boxed grouping of pixels represents one data word.

FIG. 9 depicts the case where the register size N*N2 is equal to the word size. That is, a 32-bit register size allows representation of an entire line of a 16×16 pixel blocks of a ternary pyramid (M=3, N=2).

However, depending on the number of states for each pixel (M), the number of rows (N1), the number of columns (N2) and the particular pyramid level (J) being processed, the register size N*N2 may be greater than or less than the word-size. If the register size N*N2 is greater than the word-size, it may become necessary to use more than one word to represent the data in a line. If the register size N*N2 is less than the word size, then data may be stored in an overlapped manner with redundant storage, as will now be described with respect to FIG. 10.

Figure 10:
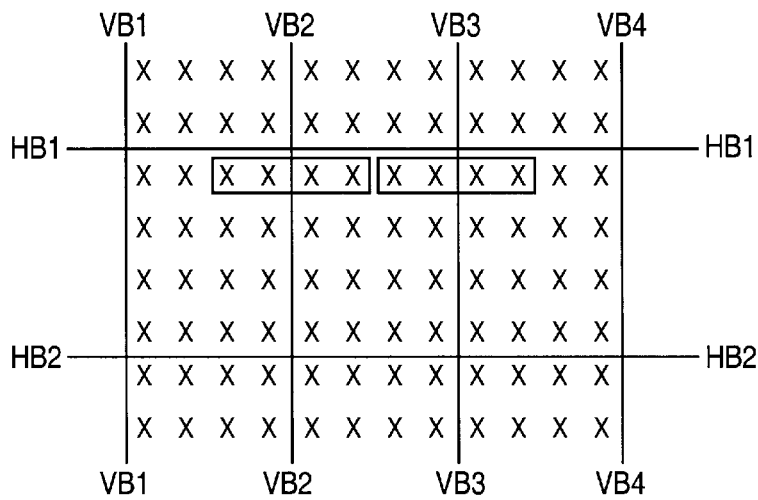

FIG. 10 illustrates a packed or blocked data representations of pixel information useful in understanding the present invention. Specifically, FIG. 10 shows a plurality of pixel blocks, each pixel block being represented by a plurality of respective words (illustratively four words), each word including information representing a plurality of pixels (illustratively four pixels). The blocks are delineated by vertical demarcations VB1–VB4 and horizontal demarcations HB1 and HB2. Each "x" represents a single pixel having M states, and each boxed grouping of pixels represents one data word.

FIG. 10 depicts the case where the register size N*N2 is less than the word size, such that data is stored in an overlapped manner with redundant storage. Note that the two four-pixel blocks include pixels from each side of a vertical demarcation line. Thus, each word contains data from its block and from the two horizontally adjacent blocks. In a hierarchical motion estimation scheme with small search ranges at the finer levels, this method will keep the number of loads to a very small number, thereby reducing memory bandwidth. If there is no overlapping, then it is necessary to load in additional words corresponding to the adjacent horizontal blocks when the block in the reference frame does not correspond to the horizontal block boundaries.

The process of packing requires two ALU operations for every pixel, a shift operation and a logical OR operation. Thus, in the case of non-overlapping packing (per FIG. 9), the number of operations per is 8/3P. In the case of over-lapping packing (per FIG. 10) additional shift and OR operations are necessary The third of the four main components comprises the moving of the packed data into registers for use in arithmetic calculations. Specifically, the third of the four main components implicates memory bandwidth issues, namely the speed at which data may be moved in and out of registers, and the number of times such movements must occur.

Figure 5:
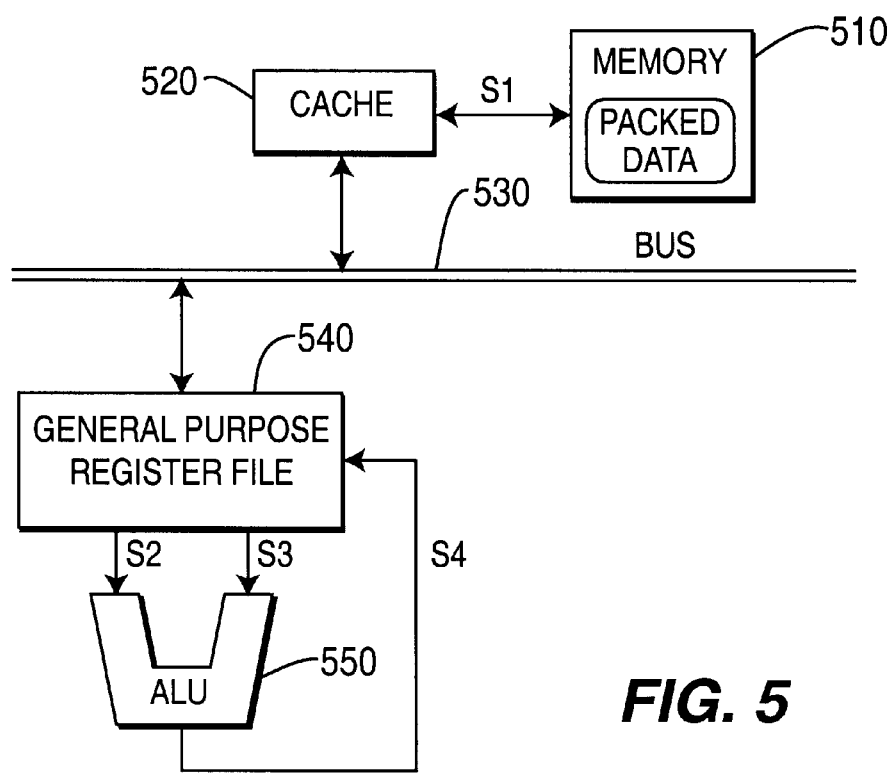
FIG. 5 illustrates a portion of a computing device useful in understanding the invention.

FIG. 5 depicts a portion of a computing device useful in understanding the invention, and particularly the memory bandwidth issue. Specifically, FIG. 5 depicts a portion of a general microprocessor or computer architecture comprising a memory module 510, a cache memory module 520, a data bus 530, a general purpose register file 540 and an arithmetic and logic unit (ALU) 550. The general purpose register file may be considered as a comprising a plurality of register groups.

Packed data representative of, e.g., an M-ary pyramid is stored in the memory module 510. To process the data in, e.g., a motion estimation process, it is first necessary to move the data to the general purpose register file 540. This is accomplished by retrieving a desired data word from the cache memory module 520 or, if necessary, directly from the memory module 510. The data is coupled from the memory module 510 to the cache memory module 520 via a signal path S1, and from the cache memory module 520 to general purpose register file 540 via the data bus 530. The data is then stored in one of a plurality of registers or register groups within the general purpose register file 540.

To perform a mathematical or logical operation on the data, the data is coupled to the ALU 550 via a first signal path S2 (or S3). If the mathematical or logical operation to be performed by the ALU 550 requires a second operand, then the second operand is coupled to the ALU 550 via a second signal path S3 (or S2). The output of the ALU 550 is then stored in a register within the general purpose register file 540. The stored output may then be stored in memory 510 via memory cache 520, thereby utilizing the data bus 530 and the signal path S1.

If the data word representing a pixel is larger than the size of the registers in general purpose register file 540 or the arithmetic or logical processing elements of the ALU 550, the data word will be processed incrementally. That is, the data word will be processed as a series of sub-words of appropriate size until the entire data word has been processed. Thus, by constraining the representation of pixel information to a data word appropriate to the general purpose register file 540 or the arithmetic or logical processing elements of the ALU 550, there data word may be processed using a single operation, rather than a series of sub-operations.

In order to perform the error calculations which will be described below with respect to the fourth of the four main components, it is necessary to get the pixel representative data into the various registers for processing. Briefly, the error calculations are used to find matches in intensity levels of pixels to help identify motion of a pixel block within a picture over time (e.g., within successive image frames). Thus, the computing arrangement depicted in FIG. 5 may be used as part of the implementation of, e.g., the motion estimation module 150 of the MPEG-like encoding system 100 of FIG. 1.

If the intensity level of each pixel in a pixel block of an original image is represented by 8 bits, and the register size is equal to 32 bits, then it is only possible to load a small fraction of the pixel block into a register at one time. Thus, when matching intensity levels of pixels in an original image (i.e., J=0), many retrieve, process and store operations must be performed to compare two pixels. However, with M-ary matching most (or all) of the intensity level data associated with a pixel block may be loaded at one time, thereby providing a substantial savings in the memory-bandwidth requirements. In many cases, the current (original) image can be loaded into the registers at the beginning of motion estimation and they always remain there throughout the search for that particular block.

A search for matching pixel blocks using the packed data representation of the invention will now be described. The search comprises the comparison of pixels intensity levels of pixels within a current pixel block to similarly sized blocks of pixels in the selected search area of, e.g., the preceding frame. Thus, it is necessary to load a current pixel block of a reference frame being processed into, e.g., the register file 540. By utilizing the packing methods described herein, the M-ary values corresponding to many pixels within a line may be stored in one word. For example, in the {M=3,N=2,N2=16} case, it is necessary to load sixteen 32-bit words into the registers of, e.g., register file 540.

For purposes of this discussion it will be assumed that the search range comprises a vertical search range of −K1 to K1 and a horizontal search range of −K2 to K2, where K1 represents the vertical direction, 2K1+1 represents the number of rows, K2 represents the horizontal direction and 2K2+1 represents the number of columns.

The first step is to load the zero search vector data into the registers. The zero search vector data may comprise a zero refinement based on a previous estimate (e.g., from a coarser pyramid level). If the zero search vector aligns with block boundaries, or if the overlapped storage is sufficient to cover the misalignment with the boundaries then only the words corresponding to the block need be loaded. Otherwise, it is necessary to load more than one set of words, and perform shift, masking and logical OR operations on the loaded word sets to properly align the data within the registers.

The error between the current block and a presently identified search block is then computed. If a match is found, then a motion vector associated with the current block is determined. The next pixel block in the reference frame is selected as the current block, and the search process is repeated for the "new" current pixel block.

If a match is not found, then the search is moved in the horizontal direction. That is, the search window is shifted horizontally by, e.g., one pixel. Again, the number of loads depends on whether or not the horizontal reference block lies along the block boundaries. The step of computing an error between the current block and a presently identified search block to identify a match is then repeated. These steps are repeated until the horizontal search range has been examined.

If the horizontal search range is examined without finding a match to the current block, then the search window is shifted vertically by one line, and the entire horizontal search range (−K2 to K2) is again examined (until a match is found). This process is repeated at every vertical position in the search range (2K1+1 positions). This is the case where there is no overlapping.

The fourth of the four main components comprises the use of the data for matching error calculations. For example, to determine if a current block (ci) matches, (i.e., is the same as, or similar to) a previous or reference block (pi) the two blocks may be exclusive OR-ed (XOR-ed) to produce a result. The number of ones in the result is the number of mismatches between the two words. The current block (ci) is said to match the previous or reference block (pi) if the number of mismatches is zero (i.e. the result is all zeros), or below some threshold level. When performing a search, this error calculation is repetitively performed until a previous or reference block (pi) matching the current block (ci) is found.

By utilizing the above-described packing and storing method, the processing and memory bandwidth required to implement the error matching calculations is greatly reduced. Moreover, if the data is packed and stored in an overlapped manner, then any mismatches (i.e., ones) within the error calculation result that are not attributable to the previous or reference block (pi) being examined are ignored.

Figure 11:
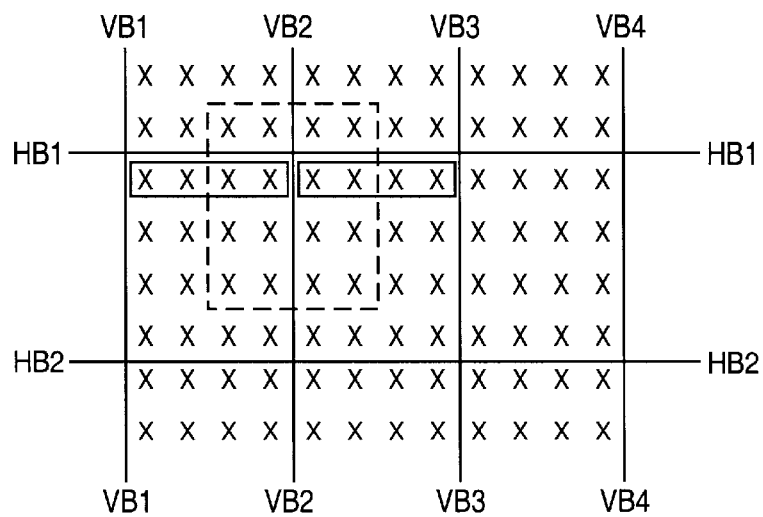

FIG. 11 illustrates a packed or blocked data representations of pixel information useful in understanding the present invention. Specifically, FIG. 11 shows a plurality of pixel blocks, each pixel block being represented by a plurality of respective words (illustratively four words), each word including information representing a plurality of pixels (illustratively four pixels). The blocks are delineated by vertical demarcations VB1–VB4 and horizontal demarcations HB1 and HB2. Each "x" represents a single pixel having M states, and each boxed grouping of pixels represents one data word.

FIG. 11 shows a current block ci, denoted by a dashed line, that includes information from two words, denoted by non-dashed lines, to provide a single line of the pixel block. Therefore, an error calculation using the entirety of each of the two words for each line may be performed in the above-described manner, but the portion of the result word attributable to data outside of the current block ci is simply ignored in determining if a match has been found. This needs to be done for all the words in each block line and the results accumulated.

In one embodiment of the invention the ones in the XOR result are counted by using a table lookup on, e.g., a table of size 256. In this embodiment, the appropriate bits within the register holding the XOR result are split into bytes, a table lookup is performed and the accumulated XOR results are added to produce a final error figure.

As previously discussed, an M-ary pyramid is built from a mean pyramid. Thus, the mean pyramid is available for the current M-ary pyramid level (i.e., the mean pyramid may be stored during construction of the M-ary pyramids and retrieved as necessary). It is also assumed that the mean value is available for each block which lies within the block boundaries, since this information can be obtained from the coarsest level in the mean pyramid.

When using the mean pyramid information as part of the matching criteria, for each shift operation it is necessary to recalculate the mean for the shifted reference block. For horizontal shifts, this is equivalent to 2N1 loads, N1 subtractions, N1 additions, and in the horizontal direction, requires 2N2 loads, N2 additions and N2 subtractions. Also, the mean matching typically requires one subtraction operation and one addition operation to combine the error in the mean with XOR error.

To perform the mean matching operation with the ternary pyramid example, 16 words are loaded into the registers and subtracted from the mean, 16 new words are then loaded into the registers and added to the mean. It must be noted that if the mean pyramid is stored in an overlapping packed manner (discussed above with respect to FIG. 10), there may be additional required operations to perform multiply or divide operations (which may be performed using shift operations). Thus, each mean calculation requires 32 loads operations and 34 arithmetic or logic operations. The total number of calculations for the one mean matching is 36, plus the number of operations for any multiply and divide operations (illustratively four).

Since direct application of full search block matching is highly inefficient, it is useful to consider a hierarchical scheme to speed up the method of the invention. In a general hierarchical scheme, an initial level pyramid is built from the image. Each coarser pyramid level is a filtered, sub-sampled version of the preceding (in terms of coarseness) image pyramid. Motion is first estimated at the coarser level of the pyramid (where the range is much lower than the range at the finest, original resolution) and then propagated to the finer levels where the search is refined over a small window. Since the range is quite small at the finer resolutions (where there are more pixels and the matching error computation needs more calculations) a substantial reduction in the number of computations over full-search block matching at the finest level is realized.

By replacing some (or all) of the levels with M-ary matching instead of intensity based matching, the computational loading at a particular level is decreased by a factor of two, and the memory bandwidth requirement is decreased by a factor of 6 or 7. This easily offsets the extra computations required for the M-ary pyramid calculation, and provides a substantial reduction in the number of computations and memory bandwidth. Note also that the M-ary pyramid are also useful for other purposes, such as image pre-processing and block classification (e.g., as described above), and that the extra computational resources may be utilized, e.g., in another module within a video encoder employing the invention.

The invention has been described within the context of a motion estimation scheme based on feature vectors obtained from M-ary pyramids. This motion estimation scheme is faster and requires less memory bandwidth than similar hierarchical motion estimation schemes. The invention has been particularly described within the context of an exemplary ternary pyramid (M=3) application in order to better illustrate computational and memory-bandwidth advantages of the invention. Similar advantages may be realized using other values of M, using other block sizes and the like. One skilled in the art and informed by the present disclosure will be able to readily adapt the teachings of the invention to other permutations that are within the scope of the appended claims below.

A packed data structure or word contains information related to at least two pixels. The packed data structure is formed using successive logical OR and shift operations to insert two or more pixel representative data segments (e.g., bytes) into a larger data word (e.g., a 32-bit word) to form a packed data structure. The packed data structures are then stored in a manner that facilitates subsequent processing. For example (as described above) four 8-bit pixel may be stored in a single 32-bit data structure, and eight 32-bit data structures may be used to store a single pixel block. In this manner, subsequent block-level processing may be performed efficiently by utilizing the packed data structures.

The number of words per row of a block (WPR) is calculated according to the following equation:

$$WPR = \frac{N(\text{BLK\_WIDTH} + \text{N\_OVERLAP\_L} + \text{N\_OVERLAP\_R}) + \text{N\_UNUSED\_BITS})}{\text{WORDSIZE}}$$

where: $M_j$ is an M-ary pyramid of level J; WIDTH is the width of the M-ary pyramid; HEIGHT is the height of the M-ary pyramid; $BLK_{13}$ WIDTH is the width of a pixel block within the M-ary pyramid; N is the number of bits per pixel; $N_{13}$ OVERLAP$_{13}$ L is he number of pixels to overlap on the left side of a block while packing; $N_{13}$ OVERLAP$_{13}$ R is he number of pixels to overlap on the right side of a block while packing; WORDSIZE is the size of the data type (in bits) into which the block is to be packed; and $N_{13}$ UNUSED$_{13}$ BITS is the number of unused bits in a packed data representation of a data type having a size of WORDSIZE.

It must be noted that WORDSIZE is chosen or fixed prior to packing the various data. Additionally, it may be determined that the packed data will not occupy every possible bit position in the word to be packed (e.g., packing three 8-bit pixel representations into a 32-bit word). Thus, WPR is modified by the number of unused bits in a word.

One important packed data structure formed comprises a packed frame, where each word within the packed frame comprises one of a multiple row, entire row or partial row of M-ary pixels within a pixel block. Each word within the packed frame also comprises additional pixels from corresponding rows of horizontal pixel block neighbors for overlapped packing. Such a packed frame may be produced by optional data packer 132 and stored in the anchor frame memory 170.

It is important to note that in a redundant storage embodiment of the invention, each data word includes pixel information that is also included in another data word. That is, a first data word includes pixel information for a first plurality of horizontally disposed pixels, a second first data word includes pixel information for a second plurality of horizontally disposed pixels, and the first and second pluralities of horizontally disposed pixels includes common (i.e., shared) pixel information.

Similarly, in an overlapping storage embodiment of the invention, each data word includes pixel information from adjoining rows of at least two pixel blocks. That is, a data word includes pixel information from a row of a first pixel block and an adjoining row of one more adjoining pixel blocks.

Figure 12:
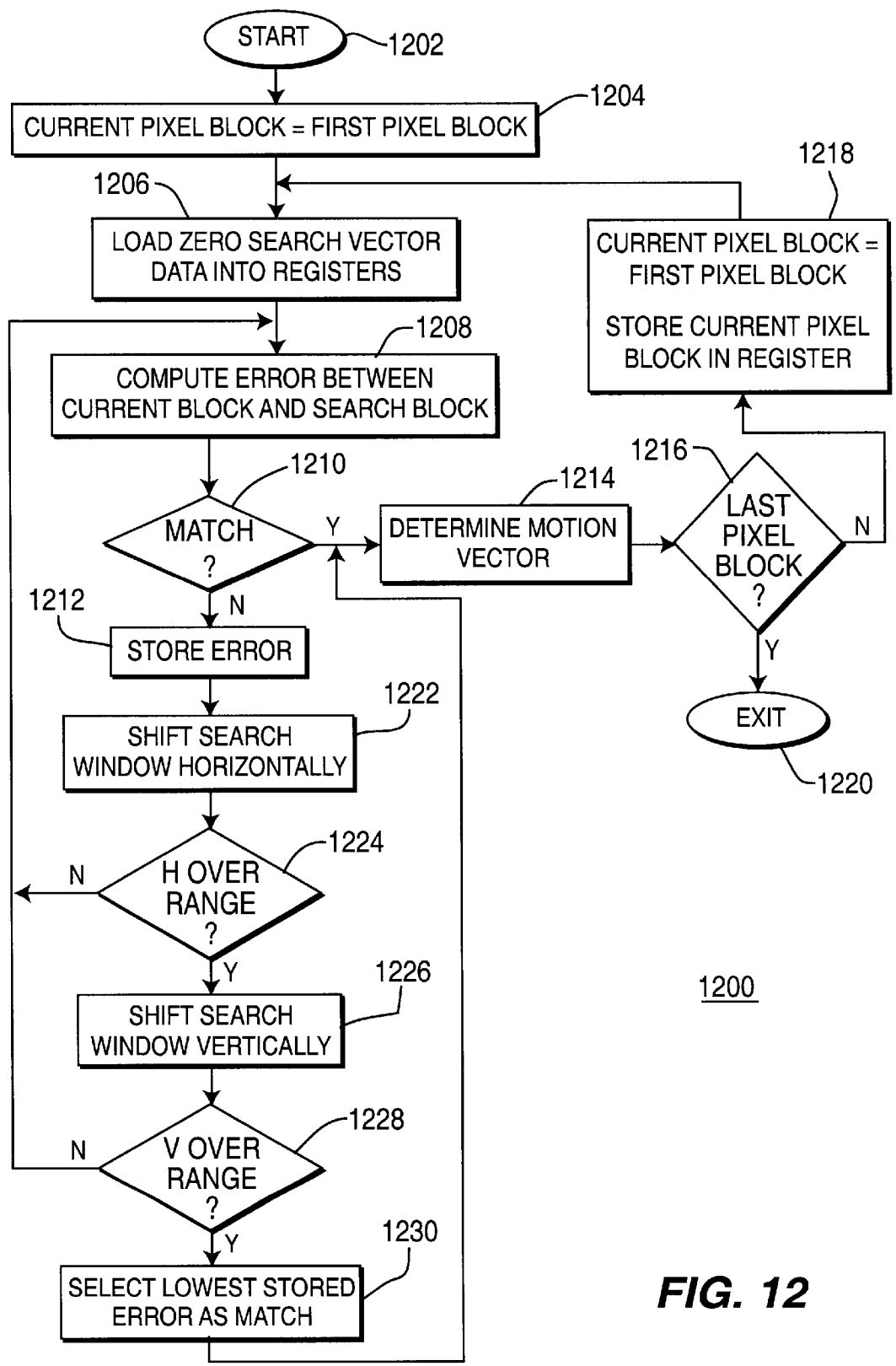

Advantageously, as in the case of the method 1200 of FIG. 12, the additional pixels from corresponding rows may be loaded into a register along with the multiple row, entire row or partial row of M-ary pixels within the pixel block. In this manner, the loaded multiple row, entire row or partial row of M-ary pixels within the pixel block may be processed rapidly using XOR and shift operations for horizontal searching, rather than only XOR and load operations.

FIG. 12 illustrates a flowchart of a method of searching for a pixel block match according to the present invention. Specifically, FIG. 12 depicts a search method suitable for use in, e.g., a block-based encoder providing, for each prediction-mode encoded block, a motion vector and residual or error information. It is important to the efficiency of such an encoder to provide a motion vector pointing to a pixel identical to, or at least similar to, the pixel block being predicted, so that the residual or error information is reduced as much as possible. Thus, the search method of FIG. 12 is advantageously used to identify, for each pixel block in an image or image pyramid, a matching (or similar) pixel block in the reference image or image pyramid.

The method 1200 compares a current pixel block (e.g., a pixel block to be predicted) to pixel information within a stored image or image pyramid that has been processed and stored in, e.g., the manner described above with respect to FIG. 12.

The method 1200 of FIG. 12 may be advantageously employed using either an packed domain reference image or packed domain reference image pyramid. For example, by comparing a low pass filtered and sub-sampled version of the current pixel block to an image pyramid of approximately the same coarseness (e.g., current pixel block and reference image pyramid of J=3 coarseness), the processing time necessary to find a match (or lack of match) for each current pixel block may be reduced.

The method of FIG. 12 is entered at step 1202 and proceeds to step 1204 where a current pixel block is set equal to a first pixel block of, e.g., an image frame to be predictively encoded (or an associated image pyramid). Since the current pixel block will be compared to packed domain pixel blocks forming a reference image or image pyramid, the first pixel block is formatted (if necessary) according to the particular packed domain representation used for the reference image or image pyramid and stored in a register (or registers) as the current pixel block. The method 1200 then proceeds to step 1206.

At step 1206 zero search vector data is loaded into one or more registers. That is, the packed data domain reference word (or reference block) including left and right overlapping data sufficient for a particular search range is loaded into one or more registers. By loading the overlapping packed data in addition to the packed data of the reference word (or block), matching operations may be performed within a limited range without additional load operations. In the case of a zero search vector being formed using multiple words, the zero search vector may be extracted from the multiple words and formatted (if necessary) according to the particular packed domain representation used for the reference image or image pyramid. The zero search vector data may comprise, e.g., a refinement made using a previous (i.e., coarser) pyramid or the zero search vector data may simply comprise the upper left portion of a region to be searched. The method 1200 then proceeds to step 1208.

At step 1208 an error between the current block and a search identified by the search vector data is computed. For example, a current pixel block is XOR-ed with the pixel block positionally identified by the search vector data to determine the distortion (i.e., difference) between the two pixel blocks. The distortion, as previously described, comprises a sum of the differences (SAD) between the two pixel blocks. In the case of a logical XOR comparison, the SAD comprises a count of the number of binary ones, where each one represents a bit or pixel of the current pixel block that does not match a corresponding bit or pixel of the reference pixel block. The magnitude of the distortion is indicative of the matching (a perfect match is a distortion of zero) or lack of matching between the two pixel blocks. The method 1200 then proceeds to step 1210.

At step 1210 a query is made as to whether the computation of step 1208 produced a match. That is, at step 1210 a query is made as to whether the number of binary ones produced by the exclusive or logical operation of the two pixel blocks is below a threshold level indicative of a match or a near-match. If the query at step 1210 is answered affirmatively, then the method 1200 proceeds to step 1214. If the query at step 1210 is answered negatively, then the method 1200 proceeds to step 1212.

At step 1214 a motion vector is determined. That is, a motion vector that relates the current pixel block to the pixel block matching the current pixel block is determined. During a subsequent encoding step in, e.g., a video encoder, the current pixel block will be encoded as a motion vector (pointing at the matching reference block) and a residual (the encoded difference between the current pixel block and matching pixel block). The method 1200 then proceeds to step 1216.

At step 1216 a query is made as to whether the current pixel block is the last pixel block of a current image or image pyramid. If the query at step 1216 is answered affirmatively, then the method 1200 proceeds to step 1220 where it is exited. If the query at step 1216 is answered negatively, then the method 1200 proceeds to step 1218.

At step 1218 the pixel block identified as the current pixel block is set equal to the next pixel block within the image frame to be predictively encoded. The next pixel block is then stored in a register (or registers) as the current pixel block. The method 1200 then proceeds to step 1206, where the process is repeated.

At step 1212 the error computed at step 1208 between the current pixel block and the pixel block of the reference frame identified by the search vector data is stored. Specifically, in the case of an error level or distortion determined by a number of ones resulting from a logical exclusive OR (XOR) operation, a number indicative of the number of ones (i.e., a sum of the number of ones) is stored and associated with that reference pixel block. The method 1200 then proceeds to step 1222.

At step 1222 the search window is horizontally shifted. That is, the search window is horizontally shifted to the left or right by, e.g., one pixel. In one embodiment of the invention the initial zero search vector data at step 1206 to describe a window at upper left of a reference frame. In this embodiment the search window is horizontally shifted from left to right over the entire range of the reference frame. Upon reaching the end of the reference frame the window is vertically shifted downward by one line and further horizontal shifts are from right to left by one pixel. The method 1200 then proceeds to step 1224.

It is important to note that the shifting of the search window within a predefined range is accomplished without loading additional data. This is because the reference pixel block (or portion thereof) loaded into the register file includes some or all of the left and right overlap portions of the packed domain data. Thus, the shifting operation realigns the loaded reference pixel block row (or rows) to the current pixel block row (or rows). For example, if a horizontal search range of ±2 pixels is used for a 16-bit row of pixels, and a 20-bit word is loaded into the register(s) at step 1206, five shift and compare operations may be performed without reloading the registers. This represents a substantial savings in terms of memory resource utilization. In the case of the pre-defined range of overlap being exceeded, it is necessary to format (using shift and logical OR operations) the various words loaded into the registers.

At step 1224 a query is made as to whether a horizontal over-range condition exists. That is, a query is made as to whether the horizontal shift of the search window at step 1224 has exceeded the bounds of the reference frame being searched (e.g., the five shift and compare operations have been performed). Optionally, where an overlapping storage technique is used, the query at 1224 indicates whether that over range portion (e.g., either right over-range or left over-range) has been exceeded by the shift operation. If the query at step 1224 is answered negatively, then the method 1200 proceeds to step 1208. If the query at step 1224 is answered affirmatively, then the method 1200 proceeds to step 1226.

At step 1226 the search window is vertically shifted by, e.g., one line. In one embodiment of the invention the search window, after being shifted to the right until a horizontal over-range condition exists, is shifted downward by one line. Thereafter, horizontal shifts of the search window proceed from right to left until the left boundary is traversed, as noted by the query at step 1224. The method 1200 then proceeds to step 1228. At step 1228 a query is made as to whether a vertical over-range condition exists. That is, a query is made as to whether the vertical shift has exceeded the reference frame being examined. If the query at step 1228 is answered negatively, then the method 1200 proceeds to step 1208. If the query at step 1228 is answered affirmatively, then the method 1200 proceeds to step 1230.

At step 1230, the lowest stored error is selected as a match for the current pixel block. That is, at step 1230 all of the possible matches for the current pixel block have been examined and the errors of each examination have been stored at step 1212. The lowest error is selected at step 1230 such that the current pixel block is associated with the pixel block having the lowest difference for error. In the case of a standard video encoder, if this lowest error exceeds a threshold level, the video encoder may choose to intra-code the current pixel block. Similarly, if the error is less than the second threshold level, the video encoder may choose to inter-code the current pixel block, and associate the inter-coded pixel block with a motion vector and residual error. The method 1200 then proceeds to step 1214.

The method 1200 described above with respect to FIG. 12 matches pixel blocks by using distortion calculations on a pixel block by pixel block basis. That is, two pixel blocks to be compared are loaded into respective register files in their entireties. XOR operations of the respective register files are performed for each of a plurality of horizontal positions (i.e., the current pixel block is shifted through multiple horizontal positions with respect to the reference pixel block (including any overlap). This method work very well, though it necessarily requires a sufficient number of registers to hold the pixel blocks. A method suitable for use in a register constrained processing environment will now be described with respect to FIG. 13.

Figure 13:
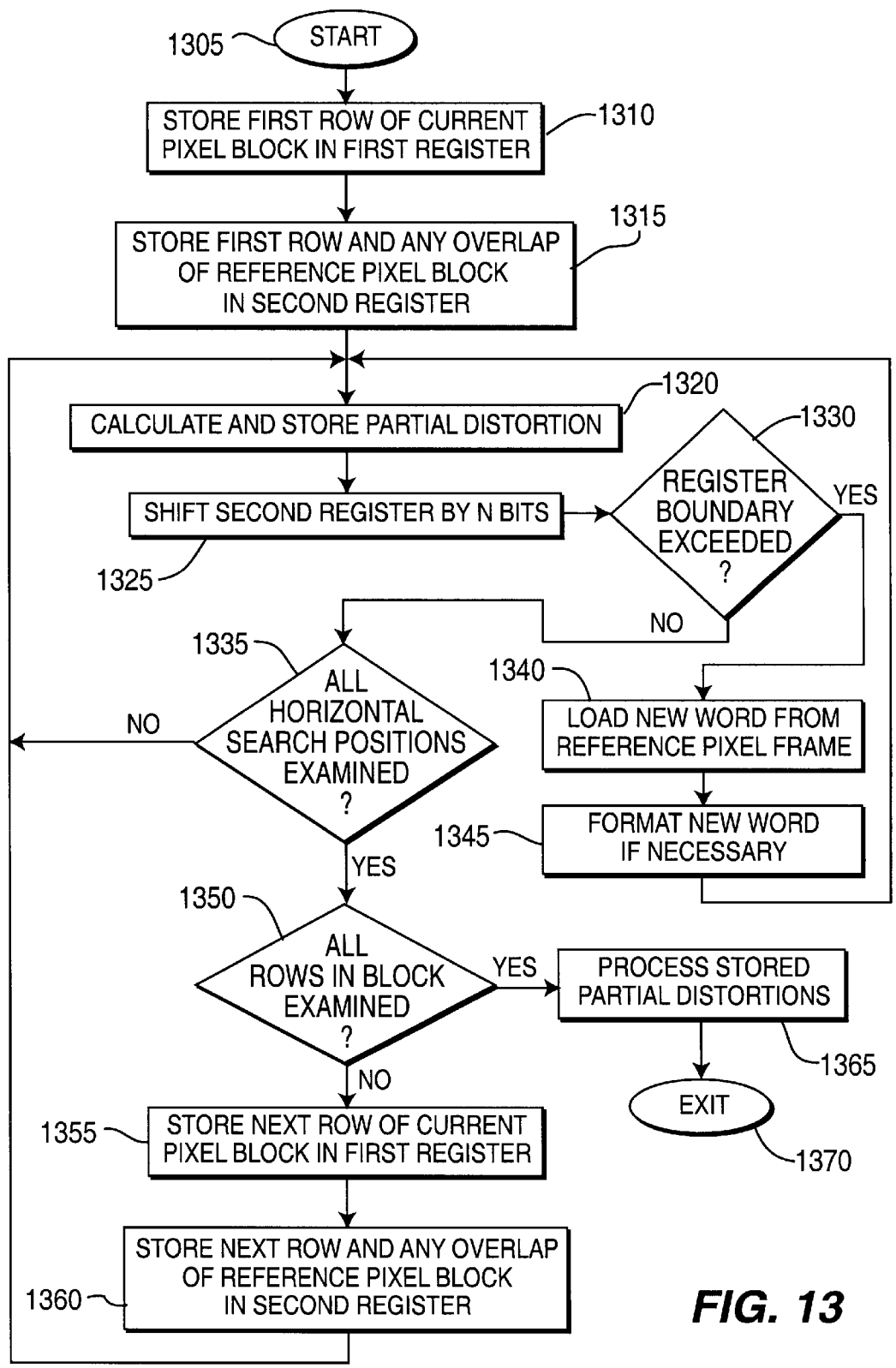
FIG. 13 illustrates a flowchart of a method of searching for a pixel block match according to the present invention.

FIG. 13 depicts a method for computing an error between a current block and a search block using partial distortion measurements. Specifically, FIG. 13 depicts row by row (rather than pixel block by pixel block) method 1300 of generating partial distortion values (rather than full distortion values). The teachings of the partial distortion method 1300 of FIG. 13 may be readily applied to the more general case described above with respect to FIG. 12.

The method 1300 of FIG. 13 compares each row of N pixels within a current pixel block to multiple N-pixel portions of an entire corresponding row of pixels within a reference pixel frame by performing repeated compare and shift functions. That is, a current pixel block row is successively compared to portions of a corresponding row of pixels within the reference pixel frame. After each row of the current pixel block is compared to a respective corresponding row within the reference pixel frame, the correspondence between the current pixel block rows and the reference pixel block rows block is vertically shifted and the process is repeated.

For example, in an embodiment of the invention utilizing eight row pixel blocks, the eight rows of a current pixel block are compared to a corresponding eight rows of a reference pixel frame (e.g., rows 1–8 of the current pixel block correspond to rows 1–8 of the reference pixel frame). The correspondence between rows is then shifted vertically by one row (i.e., rows 1–8 of the current pixel block now correspond to rows 2–9 of the reference pixel frame) and the method 1300 of FIG. 13 is repeated. This process is repeated until all rows are compared.

The method 1300 of FIG. 13 is entered at step 1305 and proceeds to step 1310. At step 1310 the first row of the current pixel block is stored in a first register. The method 1300 then proceeds to step 1315, where the first row and any overlap of the presently selected reference block is stored in a second register. The method 1300 then proceeds to step 1320.

At step 1320 a distortion between the contents of the first register and second register is calculated and stored as a partial distortion (i.e., partial with respect to the entire pixel block). That is, the first register and second register are XOR-ed together to produce a result. The number of "ones" in the result is accumulated to produce a value deemed to be a partial distortion. The partial distortion is then stored. The method 1300 then proceeds to step 1325.

At step 1325 the second register is shifted by one pixel value (i.e., N bits). The method 1300 then proceeds to step 1330 where a query is made as to whether a register boundary has been exceeded. That is, a query is made as to whether, due to the N-bit shift operation of step 1325, the row of pixels stored in the first register is no longer aligned with any (or insufficient) pixel(s) stored in the second register. If the query at step 1330 is answered negatively, then the method 1300 proceeds to step 1335. If the query at step 1330 is answered affirmatively, then the method 1300 proceeds to step 1340.

At step 1340 a new word and any overlap from the reference pixel frame is loaded into the second register. That is, a group of pixels that are horizontally contiguous (within the reference pixel frame) to the previously loaded pixels of the second register are loaded into the second register. The method 1300 then proceeds to step 1345, where the new word is formatted if necessary (i.e., if the new word does not conform to the packed data representation). The method 1300 then proceeds to step 1320.

At step 1335 a query is made as to whether the steps of calculating (step 1320) and shifting (step 1325) have been performed for each of the appropriate horizontal search positions (i.e., pixel positions in the reference pixel frame). If the query at step 1335 is answered negatively, then the method 1300 proceeds to step 1320. If the query at step 1335 is answered affirmatively, then the method 1300 proceeds to step 1350.

At step 1350 a query is made as to whether all the rows in the block have been examined. That is, a query is made as to whether the appropriate contiguous rows of pixels within the reference pixel frame have been compared to the corresponding current pixel block rows via the steps of calculating (step 1320) and shifting (step 1325). If the query at step 1350 is answered negatively, then the method 1300 proceeds to step 1355. If the query at step 1335 is answered affirmatively, then the method 1300 proceeds to step 1365.

At step 1355 the next row of the current pixel block is stored in the first register. The method 1300 then proceeds to step 1360, where the next row plus any overlap of the reference pixel block is stored in the second register. The method 1300 then proceeds to step 1320.

At step 1365, the stored partial distortions are processed to provide an indication of the correlation between the current pixel block and the reference pixel block. That is, the partial distortion values calculated for each horizontal position of the rows of the current pixel block are correlated to corresponding partial distortions calculated for each corresponding horizontal position of the other rows of the pixel block. In this manner, a global or full distortion value relating the current and reference pixel blocks may be determined.

The method 1300 of FIG. 1 is repeated for each of the vertical search positions in the reference pixel frame. It must be noted that the method 1300 of FIG. 13 compares the current pixel block to a plurality of horizontally contiguous pixel blocks. For example, in the case of a 4×4 pixel block being compared to a 4×6 reference block, three partial distortion measurements will be performed for each row. Thus, the effect is to compare each current pixel block row to corresponding rows of three distinct reference pixel blocks.

It is important to note that in the method 1300 of FIG. 13, the partial distortions corresponding to a particular horizontal search location are accumulated as they become available, thereby reducing the register requirements of a processing system performing a search.

One important embodiment of the invention is particularly useful in the case of a "register constrained" processing system, where the register resources are incapable of storing an entire current pixel block row, a corresponding reference block row (including any offset), and partial distortion measurements being processed. In such a system, the method 1300 of FIG. 13 may be adapted to process "batches" of horizontal search positions. For example, in the case of a 4×4 current pixel block and corresponding 4×9 reference pixel blocks, the method 1300 may be used to process each row twice. Specifically, instead of performing six comparisons of the current row to the reference row, the method 1300 is adapted to perform two sets of three comparisons. In this manner, the resources required to store pixel data and accumulate distortion results are reduced.

In one embodiment of the invention, the packing of data is performed "on the fly." That is, the shift and OR operations performed during, e.g., respective steps 1206 and 1208 within the context of the packing method 1200 may be performed while an M-ary pyramid is computed (for, e.g., the pyramid computation). In this manner, the memory bandwidth utilization and storage of unpacked M-ary values is avoided. For example, in the method 700 of FIG. 7, steps 210 and 215 may be merged such that step 210 is constructing an M-ary pyramid of a portion of a reference frame while step 215 is packing and storing a previously constructed portion of an M-ary pyramid (i.e., previously processed by step 210).

In one embodiment of the invention, after performing the above-described motion estimation functions, the encoder 104 utilizes a macroblock pipelining strategy to perform the remaining encoding functions. The macroblock pipelining is used to minimize memory bandwidth requirements by processing a macroblock completely before proceeding to the next macroblock. That is, the pipelining embodiment performs many encoding steps on each macroblock prior to processing the next macroblock. In this manner, the "read, process, store" computational iterations necessary to process a large group of macroblocks (i.e., an image frame) are greatly reduced.

A pipelining architecture is implemented using a plurality of processing elements (PEs), where each PE processes a respective, e.g., macroblock to produce a processed macroblock. For example, each PE comprises processor functionality comprising at least a portion of the functionality implemented for the encoding module 104, such that each PE may perform, e.g., motion estimation, mode decision, motion compensation, DCT transform and quantization functions for each respective macroblock. Each PE is associated with a memory, though a common memory module may be used for all the PEs. The inverse quantization, inverse DCT transform and variable length coding functionality of the encoder 104 may also be included within the functionality of each PE, such that (in effect) a PE comprises an entire encoding module dedicated to the encoding of a single macroblock. The output of the plurality of PEs is coupled to the output buffer 160.

In one embodiment of the invention, if the frame to be encoded is a P-frame or a B-frame, the binary pyramid motion estimation (BPME) with three scale tilings is performed using the methods disclosed in U.S. patent application Ser. No. 08/002,258, filed Dec. 31, 1997, and incorporated herein be reference in its entirety. Briefly, the motion estimation is performed for the frame, odd field and even field. If the frame is a B-frame, then both forward and backward motion estimations are performed. Advantageously, BPME with packed pixel storage reduces the memory bandwidth requirement as well an number of operations needed. Optionally, the BPME procedure is further accelerated by using a plurality of processors in a pipeline or multi-processor arrangement where each processor operates to process a respective portion of an image (e.g., a slice, macroblock or block), depending upon the available memory resources. To minimize inter-processor data access times, the processing elements (PEs) of the pipeline or multi-processor arrangement optionally utilize overlapping data regions, thereby reducing the need to perform inter-processor data copying operations.

Figure 4:
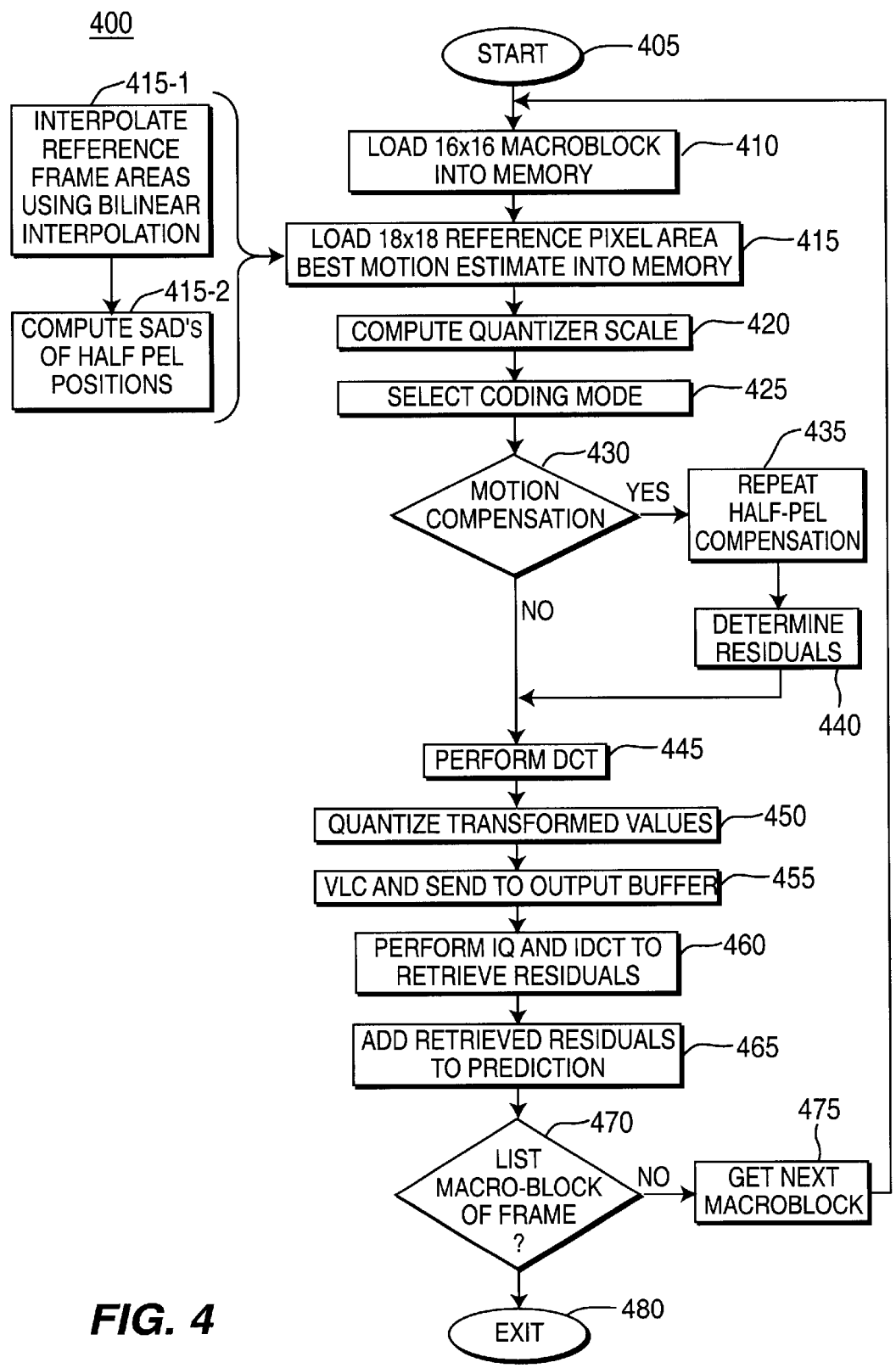
FIG. 4 depicts a flow diagram of a method for processing a macroblock in a pipelined processing architecture.

FIG. 4 depicts a flow diagram of a method for processing a macroblock in a pipelined processing architecture.

Specifically, the method 400 of FIG. 4 is used by each of a plurality of processing elements within a multiprocessing environment, where memory bandwidth is minimized by processing a macroblock completely before proceeding to the next macroblock. Though well suited for a multiprocessing environment, the method 400 of FIG. 4 may, of course, be practiced using only a single processing element. While the method 400 will be discussed within the context of 16×16 macroblocks, those skilled in the art will readily appreciate that other region sizes may be processed according to the teachings of the method 400.

The method 400 is entered at step 405 after a macroblock within an information frame being processed has been subjected to motion estimation processing resulting in a "best" motion estimate for the macroblock. The method then proceeds to step 410.

At step 410, a 16×16 pixel area for the current frame macroblock is loaded into a cache memory. The method then proceeds to step 415, where an 18×18 pixel area centered around the best motion estimate for the frame mode (or an 18×10 pixel area centered around the best motion estimate for the field mode) is loaded into the memory from the respective reference frames.

The reference frames utilized at step 410 are produced according to, illustratively, consecutive steps 415-1 and 415-2. Specifically, at step 415-1 the reference frame areas are interpolated using bilinear interpolation, and at step 415-2 the sum of the absolute differences (SADs) for each of the 9 half pel positions are computed. The best half pixel motion estimate is then chosen for each mode (frame mode or field mode) using mean squared error as the mode decision criterion. In this manner, the maximum number of pixels to load is, e.g., 1300 for P-frames and 2700 for B-frames. Advantageously, by performing line-wise interpolation the data size is kept to within reasonable level-1 cache sizes. Thus, cycle penalties for cache miss and central processing unit/Digital signal processor (CPU/DSP) idle times due to data unavailability are reduced.

After loading the 18×18 pixel area into memory (step 415), the method 400 then proceeds to step 420, where a macroblock level quantizer scale is computed by, e.g. the rate control module. The macroblock level quantizer scale is then passed to the mode decision module and the quantization module. In the exemplary embodiment, the quantizer scale computation is not performed in the conventional TM5 manner. Rather, quantizer scale computation is performed according to the methods described elsewhere in this disclosure (e.g., by averaging the buffer fullness based quantizer scale with a model-based frame level quantization), thereby ensuring smooth image quality over an entire image frame. The method 400 then proceeds to step 425.

At step 425 the coding mode is selected. The mode decision module first performs field selection to decide between top from top and top from bottom field, and, bottom from top and bottom from bottom field based on the half-pixel motion compensated distortions. It also computes intra macroblock variance and frame difference variance, as needed. Alternatively, frame difference variances are computed in the preprocessor during the scene change detection to minimize data re-access. For the other modes, the distortions obtained in the half pel refinement itself are used. The number of bits needed to code the motion vector and the overhead bits are estimated for each mode. The rate control module 140 computes a macroblock level quantizer scale and passes it to mode decision module 105. The best mode decision for the macroblock is made by jointly basing it on rate and distortion at the given macroblock quantizer scale.

A suitable arrangement for performing this function is described in more detail in U.S. patent application Ser. No. 08/738228, filed on Oct. 23, 1996 and incorporated herein by reference in its entirety. The method 400 then proceeds to step 430.

At step 430 a query is made as to whether motion compensation is required. If the query at step 430 is answered negatively, then the method 400 proceeds to step 445. If the query at step 430 is answered affirmatively, then the method 400 proceeds to step 435.

At step 435, half-pixel compensation is repeated using data presently stored in the cache as the best motion estimate. Additionally, the chrominance components for the macroblock are loaded and utilized in a motion compensation operation. The method then proceeds to step 440, where the motion compensated prediction is subtracted from the macroblock to get the residuals. The method then proceeds to step 445.

At step 445 a discrete cosine transform is performed for each of the, illustratively, six macroblocks being processed. The method then proceeds to step 450, where the transformed values are quantized using the quantization matrix and the quantization scale factor computed by the rate control module, and to step 455 where the VLC module encodes the motion vectors and the quantized DCT coefficients. The motion vectors and the quantized DCT coefficients are coupled to the output buffer and to the inverse DCT module. The method 400 then proceeds to step 460.

At step 460, the inverse quantization and inverse DCT modules recover the residuals as they will be seen by the decoder. The method 400 then proceeds to step 465 where the recovered residuals are added to the prediction to obtain a reconstructed macroblock. It should be noted that if cache sizes allow more macroblocks to fit in, then the instruction bandwidth can be minimized by repeating each module's activity on the a set of macroblocks (rather than one macroblock) before going to the next module. Since instruction access is more regular, architectures with pre-fetch mechanisms can easily fetch instructions ahead of time and make them available without any latency. For parallel processors or single instruction multiple data (SIMD) processors, multiple macroblocks can be processed at the same time with a single instruction stream. This will be discussed in more detail below with respect to FIGS. 14A and 14B. The method 400 then proceeds to step 470.

At step 470 a query is made as to whether the last macroblock of the frame has been processed. If the query at step 470 is answered negatively, then the method 400 proceeds to step 475, where the next macroblock in the frame is retrieved, and to step 410 where the retrieved macroblock is processed. If the query at step 470 is answered affirmatively, then the method 400 proceeds to step 480 where it is exited.

Figure 14A:
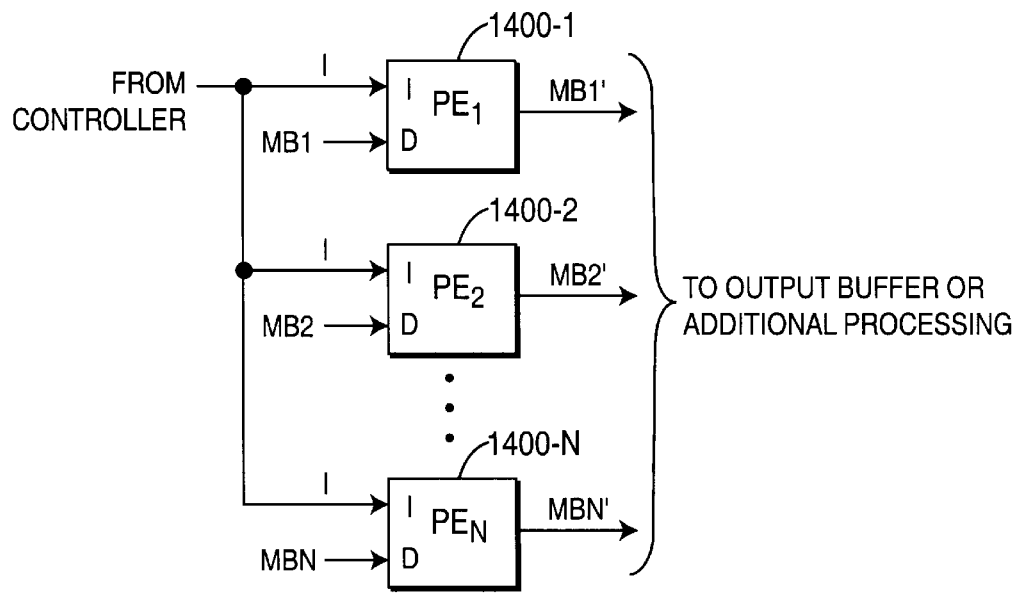
FIG. 14A depicts a pipelined processing architecture suitable for use in the MPEG-like encoder of FIG. 1.

FIG. 14A depicts a pipelined processing architecture suitable for use in the MPEG-like encoder of FIG. 1. Specifically, FIG. 14A depicts a portion of an encoding apparatus comprising a plurality of processing elements (PEs) 1400-1 through 1400-N. Each PE receives instructions (e.g., encoding instructions) via an instruction bus I and data (e.g., a macroblock) via a data bus D. Each PE responsively produces processed output data (e.g., an encoded macroblock).

In one embodiment of the present invention, the plurality of PEs of FIG. 14A are arranged as a single instruction multiple data stream (SIMD) processing system, where each processing element operates to process a process, e.g., a respective portion of an information frame being encoded such as a slice, macroblock or block. For example, FIG. 14A depicts processing elements PEL-PEN as processing respectively macroblock 1 (MB1) through macroblock N (MBN) to produce respective processed macroblocks MB1' through MBN'.

Since the instruction stream required to cause a particular processing element to process a macroblock is the same, each of the processing elements 1400-1 through 1400-N receive the same instructions from a controller (not shown). However, those skilled in the art will appreciate that a multiple instruction multiple data stream (MIMD) processing system may be implemented to achieve comparable results. In this manner, processing tasks may be divided between multiple processors, thereby reducing the time to encode an entire information frame. In the case of motion estimation, a multiple instruction multiple data stream processing system may be used to allocate a different processing element to each slice of an information frame being processed.

Figure 14B:
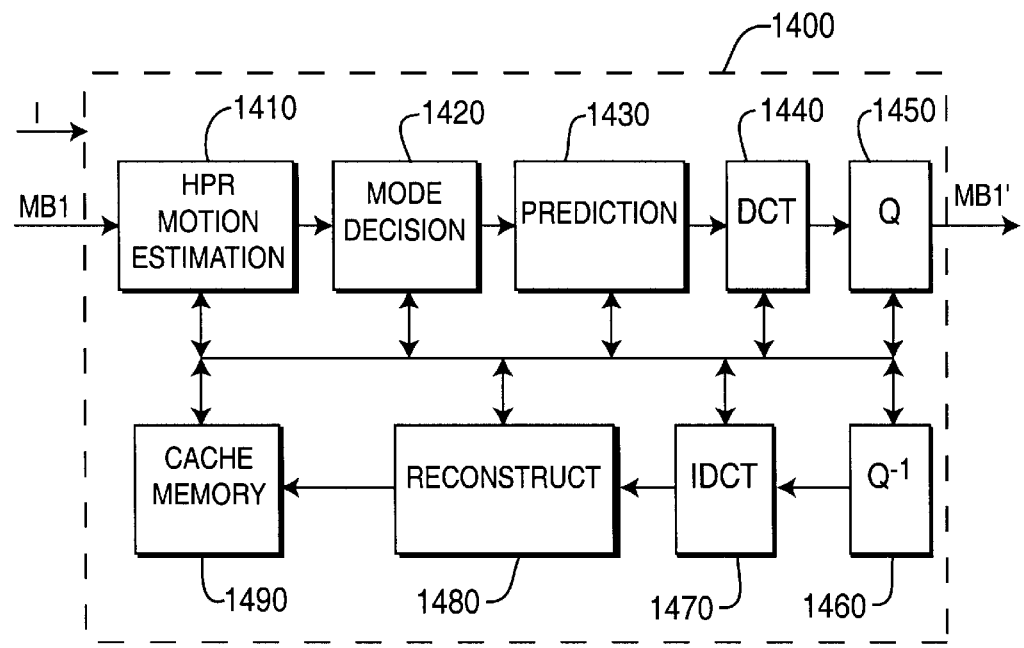
FIG. 14B depicts an embodiment of a processing element suitable for use in the pipelined processing architecture of FIG. 14A.

FIG. 14B depicts an embodiment of a processing element suitable for use in the pipelined processing architecture of FIG. 14A. Specifically, the processing element 1400 comprises the series connection of the following functional components of an encoder: a half pel resolution (HPR) motion estimation function 1410, a mode decision function 1420, a prediction function 1430, a discrete cosine transform (DCT) processing function 1440, a quantization (Q) function 1450, inverse quantization ($Q^{-1}$) function 1460, an inverse DCT function 1470 and a reconstruction function 1480.

Additionally, a cache memory 1490 is operably coupled to one or more of the functional components to provide temporary storage of information. For example, half pel resolution distortion values produced by the motion estimation function 1410 are stored in the cache memory 1490 for subsequent use by the mode estimation function 1420. Since each of the functional components of the processing element 1400 of FIG. 14B operate in substantially the same manner as corresponding functional components described above with respect to FIG. 1, the processing element functional components will not be described in detail.

Although the MPEG-like encoding system 100 comprises a plurality of modules, those skilled in the art will realize that the functions performed by the various modules are not required to be isolated into separate modules as shown in FIG. 1. For example, the set of modules comprising the motion compensation module 145, inverse quantization module 125 and inverse DCT module 130 is generally known as an "embedded decoder." Moreover, the various pre-processing functions (101 and 102) and rate control functions (140) may be performed by a single processing element (e.g., a microprocessor or digital signal processor (DSP)) or a plurality of processing elements arranged in a parallel processing configuration or as independent modules associated with respective functions. The above-described architecture may be implemented using special purpose hardware for certain high computational complexity tasks, such as for DCT and quantization tasks.

The present invention can be embodied in the form of computer-implemented processes and apparatus for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. An encoding system, comprising:

a pre-processor, for receiving and processing a plurality of information frames to produce a plurality of pre-processed information frames, said pre-processor identifying and generating an indicium of an inter-frame information discontinuity within said plurality of information frames, said pre-processor removing redundant frames from said plurality of information frames;

an encoder, for encoding each of said plurality of pre-processed information frames substantially in accordance with a group of frames (GOF) information structure; and a controller, for adapting said GOF information structure in response to said indicium of said inter-frame information discontinuity within said plurality of information frames, and for adapting a bit allocation level associated with said GOF information structure, in response to removal of redundant frames within said plurality of information frames wherein:

said pre-processor measures at least one of a spatial noise parameter and a temporal noise parameter of said plurality of information frames;

said pre-processor, in response to said spatial noise parameter exceeding a spatial noise threshold level, imparts a spatial smoothing function to one or more of said plurality of information frames; and said pre-processor, in response to said temporal noise parameter exceeding a temporal noise threshold level, imparts a temporal smoothing function to one or more of said plurality of information frames.

2. An encoding system comprising:

a pre-processor, for receiving and processing a plurality of information frames to produce a plurality of pre-processed information frames, said pre-processor identifying and generating an indicium of an inter-frame information discontinuity within said plurality of information frames, said pre-processor spatially decomposing each information frame to form a respective detail pyramid and packing each of said detail pyramid into respective compressed data detail pyramid representations, wherein each of said information frames is decomposed into a first image pyramid and said detail pyramid is a second image pyramid that is generated using said first image pyramid;

an encoder, for encoding each of said plurality of pre-processed information frames substantially in accordance with a group of frames (GOF) information structure, said encoder comprising a motion estimation module for estimating, using said detail pyramids, motion of information regions of non-anchor information frames of said plurality of pre-processed information frames, and utilizing said compressed data detail pyramid representations to estimate motion;

an anchor frame decoder, for decoding each anchor frame produced by said encoder, a data packer, for packing each decoded anchor frame into a respective compressed data representation, and a memory, for storing each compressed data anchor frame representation; and a controller, for adapting said GOF information structure in response to said indicium of said inter-frame information discontinuity within said plurality of information frames.

3. The encoding system of claim 1, wherein:

said controller adapts a bit allocation level associated with said GOF information structure according to a quadratic rate-distortion model.

4. An encoding system, comprising:

a pre-processor, for receiving and processing a plurality of information frames to produce a plurality of pre-processed information frames, said pre-processor identifying and generating an indicium of an inter-frame information discontinuity within said plurality of information frames, said pre-processor removing redundant frames from said plurality of information frames;

an encoder, for encoding each of said plurality of pre-processed information frames substantially in accordance with a group of frames (GOF) information structure; and a controller, for adapting said GOF information structure in response to said indicium of said inter-frame information discontinuity within said plurality of information frames, and for adapting a bit allocation level associated with said GOF information structure, in response to removal of redundant frames within said plurality of information frames wherein:

said encoder comprises a plurality of processing elements, each processing element being adapted to encode a respective portion of a processed information frame being encoded.

5. The encoding system of claim 4, wherein said respective portion comprises one of slice, macroblock or block of an information frame being encoded.

6. The encoding system of claim 4, wherein each of said processing elements utilizes half pel motion estimation data for both a motion estimation function and an encoding mode decision function, said half pel motion estimation data being stored in a cache memory.

7. The encoding system of claim 4, wherein said processing elements are arranged in one of a single instruction multiple data (SIMD) arrangement and a multiple instruction multiple data (MIMD) arrangement.

8. The encoding system of claim 4, wherein each processing element comprises:

a motion estimation module, for generating a half pel motion vector relating said portion of said processed information frame being encoded to a corresponding portion of a reference information frame; and a mode decision module, for selecting a coding mode of said portion of said processed information frame being encoded, said mode decision module utilizing said half pel motion vector to select said coding mode.

9. The encoding system of claim 8, wherein each processing element further comprises:

a series coupling of a discrete cosine transform (DCT) module, a quantization (Q) module and a variable length coding (VLC) module, for coding said portion of said processed information frame being encoded.

10. The encoding system of claim 9, wherein each processing element further comprises:

a series coupling of an inverse quantization ($Q^{-1}$) module and an inverse discrete cosine transform (IDCT) module, for producing portions of said reference information frame in response to a quantized information stream produced by said quantization (Q) module; and a motion compensation module, for predicting said portion of said processed information frame being encoded according to information produced by said motion estimation module and said reference information frame.

11. The encoding system of claim 8, wherein:

said motion estimation module generates a half pel distortion signal indicative of dissimilarities between said portion of said processed information frame being encoded and said corresponding portion of said reference information frame; and said mode decision module utilizing said half pel distortion signal to select said coding mode.

12. The encoding system of claim 6, wherein:

said pre-processor includes a data packer for producing a packed data representation of each of a plurality of detail pyramids that are associated with each respective processed information frame being encoded; and each of said processing elements includes a respective data packer for producing a respective packed data representation of each of a plurality of detail pyramids that are associated with said reference information frame.

13. The encoding system of claim 12, wherein: said motion estimation module utilizes said compressed data detail pyramid representations to estimate motion.

14. A method for encoding a sequence of image frames comprising the steps of:

processing a portion of said sequence of information frames to produce a processed sequence of information frames and respective indicia of an inter-frame information discontinuity and redundant frames within said processed sequence of information frames;

encoding, substantially in accordance with a group of frames (GOF) information structure and a bit budget, said processed sequence of information frames to produce an encoded sequence of information frames including an anchor frame of a type determined by said GOF information structure;

adapting said GOF information structure in response to said indicium of an inter-frame information discontinuity within said processed sequence of information frames; and adapting said bit budget in response to said indicium of redundant frames within said processed sequence of information frames wherein said step of processing further comprises the steps of:

measuring at least one of a spatial noise parameter and a temporal noise parameter of said plurality of information frames;

imparting, in response to said spatial noise parameter exceeding a spatial noise threshold level, a spatial smoothing function to one or more of said information frames forming said processed sequence of information frames; and imparting, in response to said temporal noise parameter exceeding a temporal noise threshold level, a temporal smoothing function to one or more of said information frames forming said processed sequence of information frames.

15. The method of claim 14, further comprising the step of:
decomposing, into respective detail pyramids, each of said information frames forming said processed sequence of information frames; wherein
said step of encoding said processed sequence of information frames comprises the steps of:
estimating, for each of a plurality of information frame regions forming each non-anchor frame, a respective inter-frame motion parameter using said respective detail pyramids;
determining, for each of said plurality of information frame regions forming each non-anchor frame, a respective coding mode; and
encoding, according to said respective coding mode, each of said plurality of information frame regions.

16. The method of claim 15, wherein at least two of said information frame regions forming each non-anchor frame are processed substantially contemporaneously using respective processing elements operating in a pipelined manner.

17. The method of claim 15, wherein said step of estimating comprises the step of:
comparing said information frame region to each of a plurality of correspondingly sized portions of an anchor frame reference pixel area to produce a respective plurality of sum of absolute difference (SAD) values, said anchor frame pixel area being larger than said information frame region;
selecting, as a match, the correspondingly sized portion of said anchor frame reference pixel area having associated with it the lowest SAD value below a threshold SAD value level; and
repeating, until a match is determined, said steps of comparing and selecting for each of the remaining anchor frame reference pixel areas forming said anchor frame.

18. The method of claim 17, wherein said step of comparing comprises the steps of:
loading, into a first-portion of a memory, at least one row of pixels of said information frame region;
loading, into a second portion of said memory, at least one row of pixels of said anchor frame reference pixel area;
computing, for each of a plurality of data alignment positions, SAD values for said pixel row information in said first and second portions of memory;
preferentially loading, in response to said computed SAD values being relatively low, additional portions of said information frame region and said anchor frame reference pixel area into, respectively, said first and second portions of said memory;
repeating said steps of computing and preferentially loading until a SAD value associated with each of a plurality of corresponding portions of said information frame region and said anchor frame reference pixel area is determined.

19. The method of claim 14, wherein said step of adapting said GOF information structure comprises the step of:
defining, as an intra-coded anchor frame, the anchor frame temporally following said information discontinuity; and
defining, as a predictively coded anchor frame, the anchor frame temporally preceding said information discontinuity.

* * * * *

UNITED STATES PATENT AND TRADEMARK OFFICE
CERTIFICATE OF CORRECTION

PATENT NO. : 6,434,196 B1 Page 1 of 1
DATED : August 13, 2002
INVENTOR(S) : Sriram Sethuraman, Tihao Chiang, Xudong Song, Ravi Krishnamurthy, Paul Hatrack and Ya-Qin Zhang It is certified that error appears in the above-identified patent and that said Letters Patent is hereby corrected as shown below:

Column 3,
Lines 60 and 62, please change "$R_{13}$ TOP" with -- R_TOP --
Lines 61 and 66, please change "$R_{13}$ BOT" with -- R_BOT --

Column 4,
Line 55, please change "$R_{13}$ TOP and $R_{13}$BOT" to -- R_TOP and R_BOT --

Column 5,
Line 20, please change "$R_{13}$ TOP" to -- R_TOP --
Line 21, please change "$R_{13}$ BOT" to -- R_BOT --

Column 14,
Line 63, please change "$R_{13}$ TOP" to -- R_TOP --
Line 64, please change "$R_{13}$ BOT" to -- R_BOT --

Column 26,
Line 42, please change "$BLK_{13}$ WIDTH" to -- BLK_WIDTH --
Line 44, please change "$N_{13}$ OVERLAP $_{13}$L" to -- N_OVERLAP_L --
Line 45, please change "$N_{13}$ OVERLAP $_{13}$R" to -- N_OVERLAP_R --
Line 48, please change "$N_{13}$ $UNUSED_{13}BITS$" to -- N_UNUSED_BITS --

Signed and Sealed this

Seventeenth Day of December, 2002

JAMES E. ROGAN
*Director of the United States Patent and Trademark Office*